(12) United States Patent
Jo

(10) Patent No.: US 12,153,523 B2
(45) Date of Patent: Nov. 26, 2024

(54) METHOD OF OPERATING DISAGGREGATED MEMORY SYSTEM FOR CONTEXT-AWARE PREFETCH AND DISAGGREGATED MEMORY SYSTEM PREFORMING THE SAME

(71) Applicant: SAMSUNG ELECTRONICS CO., LTD., Suwon-si (KR)

(72) Inventor: Insoon Jo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 17/865,637

(22) Filed: Jul. 15, 2022

(65) Prior Publication Data
US 2023/0153245 A1    May 18, 2023

(30) Foreign Application Priority Data
Nov. 15, 2021 (KR) ..................... 10-2021-0156543

(51) Int. Cl.
G06F 12/0862 (2016.01)
(52) U.S. Cl.
CPC .. G06F 12/0862 (2013.01); *G06F 2212/1024* (2013.01); *G06F 2212/6026* (2013.01)
(58) Field of Classification Search
CPC ......... G06F 12/0862; G06F 2212/1024; G06F 2212/6026
See application file for complete search history.

(56) References Cited

U.S. PATENT DOCUMENTS

| | | |
|---|---|---|
| 8,560,778 B2 | 10/2013 | Floman et al. |
| 8,751,701 B2 | 6/2014 | Shahar et al. |
| 9,098,400 B2 | 8/2015 | El Maghraoui et al. |
| 9,223,707 B2 | 12/2015 | Floman et al. |
| 9,946,654 B2 | 4/2018 | Meha et al. |

(Continued)

FOREIGN PATENT DOCUMENTS

| | | |
|---|---|---|
| JP | 2014-523046 A | 9/2014 |
| JP | 6488962 B2 | 3/2019 |

OTHER PUBLICATIONS

Kommareddy et al., "PreFAM: Understanding the Impact of Prefetching in Fabric-Attached Memory Architectures", Association for Computing Machinery, MEMSYS 2020, Sep. 28-Oct. 1, 2020, https://doi.org/10.1145/3422575.3422804, (12 pages total).

*Primary Examiner* — Gurtej Bansal
(74) *Attorney, Agent, or Firm* — Sughrue Mion, PLLC

(57) ABSTRACT

A method of operating a disaggregated memory system includes receiving memory management requests from a host device, the memory management requests including context values having different values for plural workloads. The context values are transmitted to an accelerator memory including memory regions to set the context values for the memory regions based on the memory management requests. Prefetch target data is determined based on a context table and a memory access log, and prefetch information associated with the prefetch target data is transmitted to the accelerator memory. The context table includes the context values, and the memory access log is associated with the accelerator memory. The prefetch information is stored in a prefetch target buffer included in the accelerator memory.

20 Claims, 21 Drawing Sheets

(56) References Cited

U.S. PATENT DOCUMENTS

| | | | |
|---|---|---|---|
| 10,289,555 B1 * | 5/2019 | Michaud | G06F 12/109 |
| 10,572,307 B2 | 2/2020 | Suman et al. | |
| 10,768,966 B1 * | 9/2020 | Naenko | G06F 9/45545 |
| 2005/0138296 A1 | 6/2005 | Coulson et al. | |
| 2018/0024932 A1 | 1/2018 | Nachimuthu et al. | |
| 2021/0390053 A1 * | 12/2021 | Roberts | G06F 12/0862 |

* cited by examiner

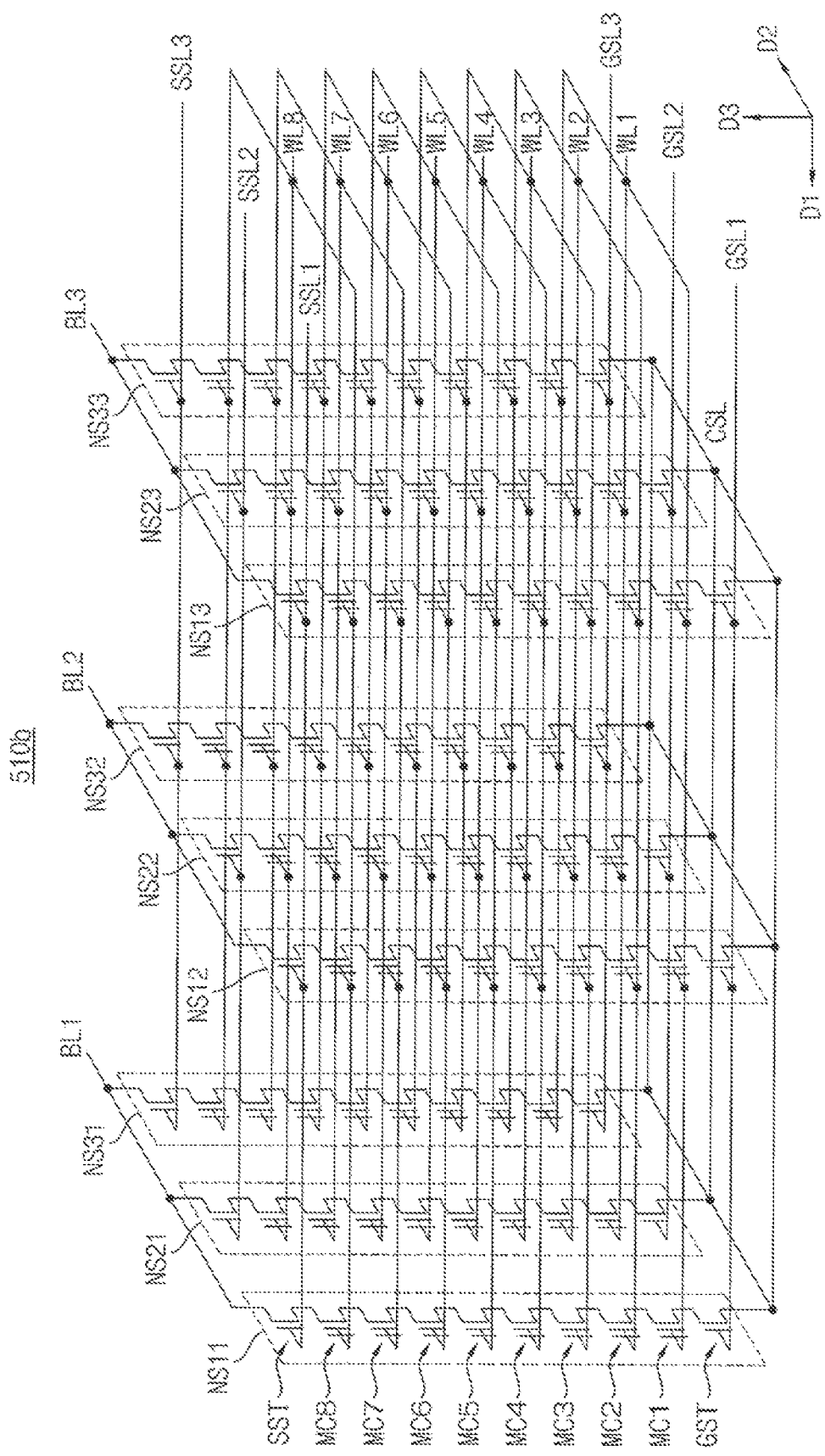

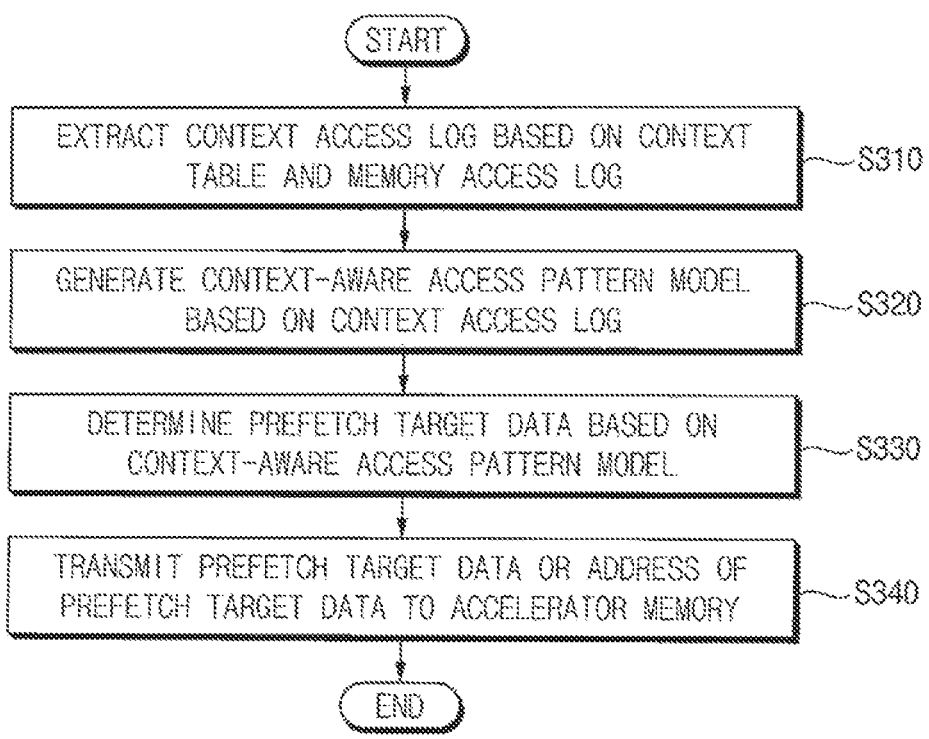

METHOD OF OPERATING DISAGGREGATED MEMORY SYSTEM FOR CONTEXT-AWARE PREFETCH AND DISAGGREGATED MEMORY SYSTEM PREFORMING THE SAME

CROSS-REFERENCE TO RELATED APPLICATION

This application claims priority under 35 USC § 119 to Korean Patent Application No. 10-2021-0156543 filed on Nov. 15, 2021 in the Korean Intellectual Property Office (KIPO), the contents of which are herein incorporated by reference in their entirety.

BACKGROUND

Example embodiments relate generally to semiconductor integrated circuits, and more particularly to methods of operating disaggregated memory systems for context-aware prefetch, and disaggregated memory systems performing the methods.

Semiconductor memory devices can generally be divided into two categories depending upon whether or not they retain stored data when disconnected from a power supply. These categories include volatile memory devices, which lose stored data when disconnected from power, and non-volatile memory devices, which retain stored data when disconnected from power. Volatile memory devices may perform read and write operations at a high speed, while contents stored therein may be lost at power-off. Nonvolatile memory devices may retain contents stored therein even at power-off, which means they may be used to store data that must be retained regardless of whether they are powered.

Recently, many computer applications (e.g., data center applications) require large amounts of memories (e.g., dynamic random access memories (DRAMs)). In addition, applications using servers are requiring an increasing amount of memories that are outpacing the system's ability to provide it. However, it is becoming difficult to add memories to the system due to issues such as latency and bandwidth. Various methods have been researched to increase the amount of memories in the system while maintaining low latency and high interconnect bandwidth.

SUMMARY

It is an aspect to provide a method of operating a disaggregated memory system capable of performing context-aware prefetch.

It is another aspect to provide a disaggregated memory system performing the method.

According to an aspect of one or more example embodiments, there is provided a method of operating a disaggregated memory system, the method comprising receiving a plurality of memory management requests from a host device, the plurality of memory management requests including a plurality of context values having different values for a plurality of workloads; transmitting the plurality of context values to an accelerator memory including a plurality of memory regions to set the plurality of context values for the plurality of memory regions based on the plurality of memory management requests; determining prefetch target data based on a context table and a memory access log, and transmitting prefetch information associated with the prefetch target data to the accelerator memory, the context table including the plurality of context values, the memory access log being associated with the accelerator memory; and storing the prefetch information in a prefetch target buffer included in the accelerator memory.

According to another aspect of one or more example embodiments, there is provided a disaggregated memory system comprising a memory controller, and an accelerator memory controlled by the memory controller, the accelerator memory including a plurality of memory regions, a context table, a memory access log, and a prefetch target buffer. The memory controller is configured to receive a plurality of memory management requests from a host device, the plurality of memory management requests including a plurality of context values having different values for a plurality of workloads, manage the context table such that the plurality of context values are set for the plurality of memory regions based on the plurality of memory management requests, select prefetch target data based on the context table and the memory access log, the memory access log being associated with the accelerator memory, and transmit prefetch information associated with the prefetch target data to the accelerator memory. The accelerator memory is configured to store the prefetch information in the prefetch target buffer.

According to yet another aspect of one or more example embodiments, there is provided a method of operating a disaggregated memory system, the method comprising receiving a plurality of memory management requests from a host device, the plurality of memory management requests including a plurality of context values having different values for a plurality of workloads; transmitting a context table control signal and the plurality of context values to an accelerator memory to manage a context table based on the plurality of memory management requests, the context table including a relationship between a plurality of memory regions included in the accelerator memory and the plurality of context values that are set for the plurality of memory regions; extracting a context access log from all of the plurality of workloads based on the context table and a memory access log, the memory access log being associated with the accelerator memory; selecting at least one of the plurality of context values based on a context selection request received from the host device or based on the context access log; generating a context-aware access pattern model based on the context access log, the context-aware access pattern model being generated for a selected workload corresponding to a selected context value among the plurality of workloads; determining prefetch target data for the selected workload based on the context-aware access pattern model; transmitting the prefetch target data or an address of the prefetch target data to the accelerator memory; and storing the prefetch target data or the address of the prefetch target data in a prefetch target buffer included in the accelerator memory.

BRIEF DESCRIPTION OF THE DRAWINGS

Illustrative, non-limiting example embodiments will be more clearly understood from the following detailed description taken in conjunction with the accompanying drawings, in which:

FIGS. 7A, 7B, 7C, 7D and 7E are circuit diagrams illustrating examples of a memory cell array included in an accelerator memory of FIG. 6;

FIGS. 8 and 9 are flowcharts illustrating examples of selecting prefetch target data in the method of FIG. 1, according to various example embodiments;

DETAILED DESCRIPTION

Figure 1:
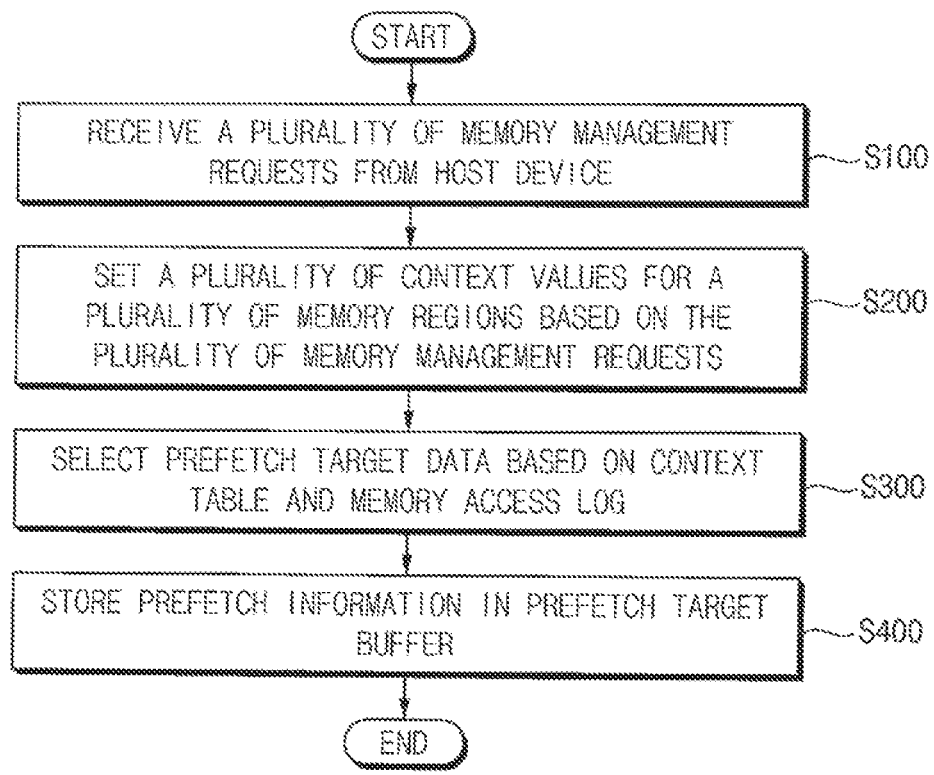
FIG. 1 is a flowchart illustrating a method of operating a disaggregated memory system according to example embodiments.

In the method of operating the disaggregated memory system and in the disaggregated memory system according to various example embodiments, a context-aware prefetch may be implemented to reduce a memory access latency and to improve performance. For example, a plurality of context values may be set and used to classify a memory access for a plurality of workloads. To reduce loads associated with a prefetch and with context management, the disaggregated memory system, rather than a host device, may perform operations of processing the prefetch and managing the context. In addition, the disaggregated memory system may independently maintain and manage a context table and a memory access log, may generate an access pattern model for each context based on the context table and the memory access log, and may select a prefetch target based on the access pattern model. Accordingly, the accuracy of the prefetch may be maintained regardless of the number of workloads, the load associated with the prefetch may not be a problem even when the number of workloads increases, and an efficient prefetch scheme suitable or appropriate for a multi-workload environment may be implemented.

Various example embodiments will now be described more fully with reference to the accompanying drawings, in which various example embodiments are shown. The present disclosure may, however, be embodied in many different forms and should not be construed as limited to the example embodiments set forth herein. Like reference numerals refer to like elements throughout this application.

FIG. 1 is a flowchart illustrating a method of operating a disaggregated memory system according to example embodiments.

Referring to FIG. 1, a method of operating a disaggregated memory system according to example embodiments is performed by a disaggregated memory system that includes an accelerator memory and a memory controller. The disaggregated memory system may be referred to as a disaggregated memory device. The disaggregated memory system is physically separated from a host device, and exchanges signals and data with the host device. A configuration of the disaggregated memory system will be described later with reference to FIG. 2.

In the method of operating the disaggregated memory system according to example embodiments, a plurality of memory management requests are received from the host device (step S100). For example, the memory controller may receive a plurality of memory management requests from the host device (step S100). The plurality of memory management requests may include a plurality of context values. The plurality of context values may be set or allocated for a plurality of workloads that are executed on or driven by the host device, and may have different values for the plurality of workloads. In other words, different context values may be set for different workloads. A configuration of the plurality of workloads will be described later with reference to FIGS. 3A and 3B.

A plurality of context values are set for a plurality of memory regions based on the plurality of memory management requests (step S200). For example, the memory controller may transmit the plurality of context values to the accelerator memory to set the plurality of context values for a plurality of memory regions based on the plurality of memory management requests. The plurality of memory regions may be included in the accelerator memory. For example, the accelerator memory may include a context table that includes the plurality of context values. For example, the context table may include or represent a relationship between the plurality of memory regions and the plurality of context values set for the plurality of memory regions. For example, the memory controller may transmit a context table control signal and the plurality of context values to the accelerator memory to manage the context table. A configuration of the context table will be described later with reference to FIGS. 4A and 4B.

Prefetch target data is selected based on the context table and a memory access log (step S300). For example, the memory controller may select prefetch information associated with or related to at least one prefetch target data based on the context table and a memory access log and may transmit the at least one prefetch target data to the accelerator memory. The memory access log may be associated with the accelerator memory. For example, the memory access log may be included in the accelerator memory. For example, the prefetch target data may be determined for all of the plurality of workloads or may be determined only for some of the plurality of workloads. Step S300 will be described in more detail below with reference to FIGS. 8 and 9.

The prefetch information is stored in a prefetch target buffer (step S400). For example, the prefetch information may be stored in a prefetch target buffer included in the accelerator memory. The accelerator memory may operate based on the prefetch information stored in the prefetch target buffer, the prefetch information may be generated based on the context table, and thus the accelerator memory may perform context-aware or context-based prefetch.

With many recent advances in interconnect technologies and memory interfaces, disaggregated memory systems are approaching industrial adoption. A general local memory system may be disposed in the same computing system as a host device, and may be directly connected to the host device. In contrast, a disaggregated memory system may be disposed in a computing system different from a host device or disposed physically separated from the host device, and may be connected to the host device based on various interconnect technologies. For example, the disaggregated memory systems may be implemented in the form of a network-attached memory system that is connected to the host device through various wired and wireless networks, or a fabric-attached memory system that is connected to the host device through various fabric interconnects, or the like.

Low-latency and high-capacity memories, such as a phase change random access memory (PRAM), or the like, and high-speed interconnects, such as Gen-Z and compute express link (CXL), or the like, may be applied or employed to the disaggregated memory systems. For example, the recent Gen-Z consortium focuses on a new memory semantic protocol using fabric interconnects. For example, the CXL protocol is open standard interconnects for high-speed central processing unit (CPU)-to-device and CPU-to-memory connections, designed for high performance data center computers. Decoupling of memory systems from computing systems may become a feasible option as the data transfer rate increases due to the emergence of such interconnect technologies.

The disaggregated memory systems may have great advantages in terms of capacity, but may need improvement in terms of latency. For example, the disaggregated memory systems not only enable more efficient use of capacity (e.g., minimizing under-utilization), but the disaggregated memory systems also allow easy integration of evolving technologies. Additionally, the disaggregated memory systems simplify the programming model at the same time allowing efficient sharing of data. However, the latency of accessing the data in these disaggregated memory systems may be dependent on the latency imposed by the interconnect technologies and memory interfaces, and may be very slow compared to the local memory systems.

As discussed above, in the method of operating the disaggregated memory system according to various example embodiments, the context-aware prefetch may be implemented to reduce the memory access latency and to improve the performance. For example, the plurality of context values may be set and used to classify the memory access for the plurality of workloads. To reduce the loads associated with the prefetch and the context management, the disaggregated memory system, rather than the host device, may perform the operations of processing the prefetch and managing the context. In addition, the disaggregated memory system may independently maintain and manage the context table and the memory access log, may generate the access pattern model for each context based on the context table and the memory access log, and may select the prefetch target based on the access pattern model. Accordingly, the accuracy of the prefetch may be maintained regardless of the number of workloads, the load associated with the prefetch may not be a problem even when the number of workloads increases, and the efficient prefetch scheme suitable or appropriate for a multi-workload environment may be implemented.

Figure 2:
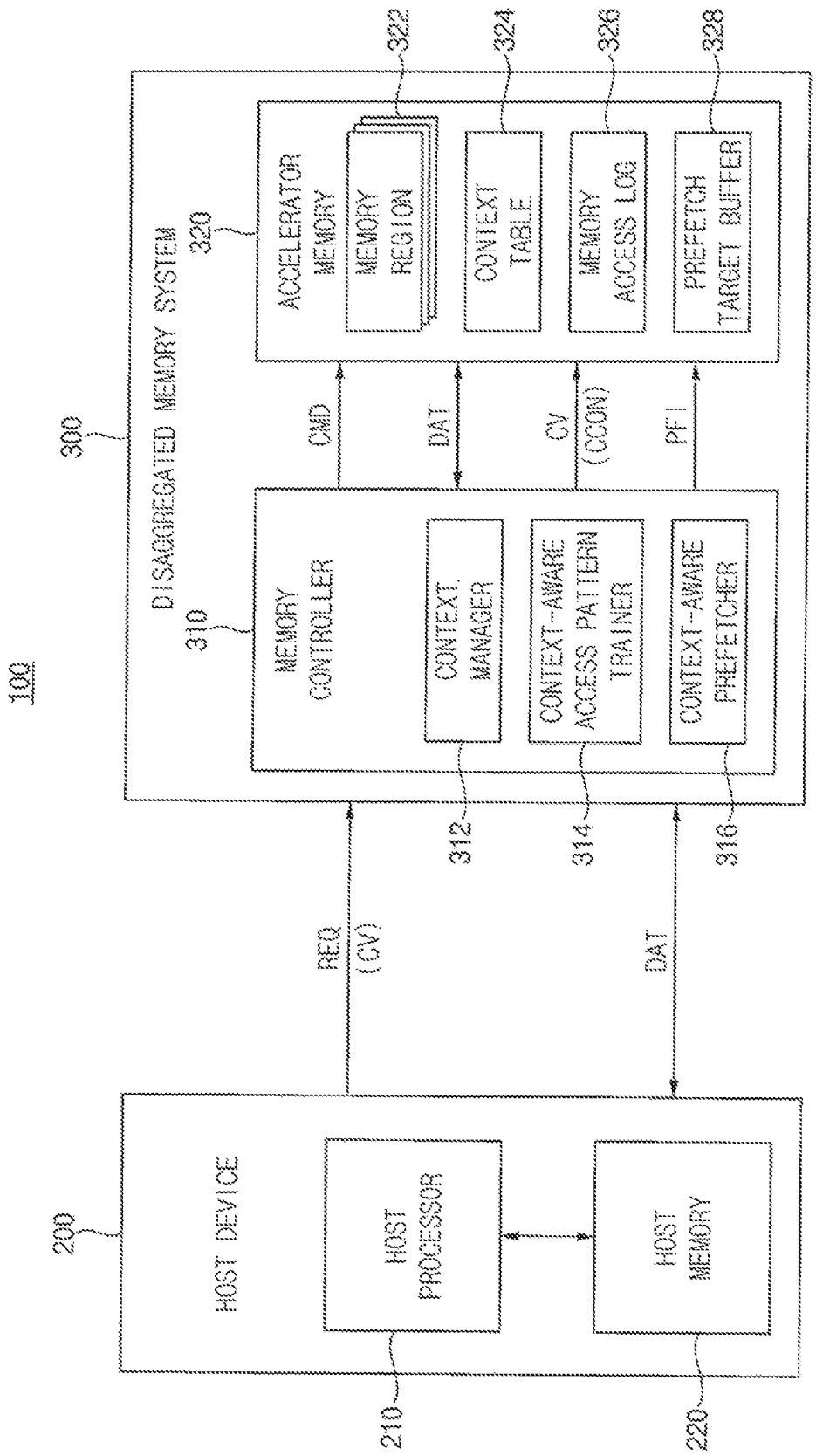
FIG. 2 is a block diagram illustrating a disaggregated memory system and an electronic system including the disaggregated memory system according to example embodiments.

FIG. 2 is a block diagram illustrating a disaggregated memory system and an electronic system including the disaggregated memory system according to example embodiments.

Referring to FIG. 2, an electronic system 100 includes a host device 200 and a disaggregated memory system 300.

The host device 200 controls overall operations of the electronic system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the disaggregated memory system 300 at the operating system level. For example, the host processor 210 may include at least one of various processing units, e.g., a central processing unit (CPU), a microprocessor, or the like.

The host memory 220 may store instructions and/or data that are executed and/or processed by the host processor 210. For example, the host memory 220 may include at least one of various volatile memories, e.g., a dynamic random access memory (DRAM), or the like.

The disaggregated memory system 300 is accessed by the host device 200. The disaggregated memory system 300 may include a memory controller 310 and an accelerator memory 320. The memory controller 310 may include a context manager 312, a context-aware access pattern trainer 314 and a context-aware prefetcher 316. The accelerator memory 320 may include a plurality of memory regions 322, a context table 324, a memory access log 326 and a prefetch target buffer 328.

The memory controller 310 may control an operation of the disaggregated memory system 300. For example, the memory controller 310 may generate a command CMD for controlling an operation of the accelerator memory 320 based on a request REQ received from the host device 200. For example, the memory controller 310 may store data DAT received from the host device 200 in the accelerator memory 320, or may transmit data DAT stored in the accelerator memory 320 to the host device 200.

As described with reference to FIG. 1, the disaggregated memory system 300 may be physically separated and/or spaced apart from the host device 200, and may be connected to the host device 200 based on various interconnect technologies. For example, various wired/wireless networks (e.g., a network 6300 in FIG. 17) and/or various fabric interconnects may be formed between the host device 200 and the disaggregated memory system 300. The host device 200 and the disaggregated memory system 300 may be electrically connected to each other through the network and/or fabric interconnect, and may exchange the request REQ and the data DAT through the network and/or fabric interconnect.

The accelerator memory 320 may be controlled by the memory controller 310, and may store the data DAT. The data DAT may be stored in the plurality of memory regions 322 included in the accelerator memory 320. For example, the accelerator memory 320 may store meta data, various user data, or the like.

In some example embodiments, the accelerator memory 320 may be a memory that is less expensive than the host memory 220 and has a capacity larger than the host memory 220. For example, the accelerator memory 320 may include a nonvolatile memory. For example, in some example embodiments, the accelerator memory 320 may include a phase change random access memory (PRAM). For example, in some example embodiments, the accelerator memory 320 may include a flash memory (e.g., a NAND flash memory), a resistance random access memory (RRAM), a nano floating gate memory (NFGM), a polymer random access memory (PoRAM), a magnetic random access memory (MRAM), a ferroelectric random access memory (FRAM), or the like.

The disaggregated memory system 300 may perform the method of operating the disaggregated memory system according to example embodiments described with reference to FIG. 1. For example, the memory controller 310 may receive a plurality of memory management requests including a plurality of context values CV from the host device 200. The plurality of context values CV may have different values for a plurality of workloads. The memory controller 310 may manage the context table 324 such that the plurality of context values CV are set for the plurality of memory regions 322 based on the plurality of memory management requests. The memory controller 310 may transmit the plurality of context values CV and a context table control signal CCON to the accelerator memory 320 to manage the context table 324. The memory controller 310 may select prefetch target data based on the context table 324 and the memory access log 326, and may transmit prefetch information PFI associated with the prefetch target data to the accelerator memory 320. For example, the memory controller 310 may transmit a command CMD to the accelerator memory 320 for information from the context table 324 and/or the memory access log 326, and may receive data DAT including the information from the context table 324 and/or from the memory access log 326 from the accelerator memory 320 in response to the command CMD. The prefetch information PFI may be stored in the prefetch target buffer 328 included in the accelerator memory 320. In addition, the disaggregated memory system 300 may perform a method of operating a disaggregated memory system according to example embodiments, which will be described later with reference to FIG. 12.

In some example embodiments, the request REQ received from the host device 200 may include the plurality of memory management requests described with reference to FIG. 1. As described above, the plurality of memory management requests may include the plurality of context values CV. For example, the plurality of memory management requests may include a request for allocating the plurality of workloads to the plurality of memory regions 322, and a request for deallocating the plurality of workloads from the plurality of memory regions 322. For example, the plurality of memory management requests may further include a request for changing an ownership of the plurality of memory regions 322.

In other example embodiments, the request REQ received from the host device 200 may further include a context selection request, which will be described later with reference to FIG. 10, or at least one additional memory management request, which will be described later with reference to FIG. 12, or the like. For example, the additional memory management request may include at least one of the plurality of context values CV.

The context manager 312 may manage the context table 324, and may control the transmission of the plurality of context values CV and the context table control signal CCON. The context-aware access pattern trainer 314 may extract a context access log based on the context table 324 and the memory access log 326, and may generate a context-aware access pattern model based on the context access log.

The context-aware prefetcher 316 may determine the prefetch target data based on the context-aware access pattern model.

The context table 324 may include a relationship between the plurality of memory regions 322 and the plurality of context values CV set for the plurality of memory regions 322. The memory access log 326 may include a history in which the plurality of memory regions 322 of the accelerator memory 320 are accessed by the host device 200. The context table 324 and the memory access log 326 may be stored in some of the plurality of memory regions 322, or may be stored in a separate storage space in the accelerator memory 320. Some of the plurality of memory regions 322 may be used as the target prefetch buffer 328, or the target prefetch buffer 328 may be formed as a separate hardware in the accelerator memory 320.

As described above, in the disaggregated memory system 300 according to example embodiments, the context table 324 and the context manager 312 for controlling and managing the context table 324 may be implemented for the context-aware prefetch, an access pattern trainer and a prefetcher for performing prefetch may be implemented as the context-aware access pattern trainer 314 and the context-aware prefetcher 316, respectively, and the prefetch target buffer 328 that stores the prefetch information PFI may be implemented. In addition, to reduce the loads associated with the prefetch and the context management, all of the above-described components may be formed and/or disposed in the disaggregated memory system 300.

In some example embodiments, the disaggregated memory system 300 may be implemented in the form of a storage device. For example, the disaggregated memory system 300 may be a solid state drive (SSD), a universal flash storage (UFS), a multi-media card (MMC) or an embedded multi-media card (eMMC). Alternatively, the disaggregated memory system 300 may be one of a secure digital (SD) card, a micro SD card, a memory stick, a chip card, a universal serial bus (USB) card, a smart card, a compact flash (CF) card, or the like.

In some example embodiments, the disaggregated memory system 300 may be connected to the host device 200 through a high-speed interconnect such as Gen-Z, CXL, or the like. However, example embodiments are not limited thereto and, in some example embodiments, the disaggregated memory system 300 may be connected to the host device 200 through a block accessible interface which may include, for example, a small computer small interface (SCSI) bus, a serial attached SCSI (SAS) bus, a peripheral component interconnect express (PCIe) bus, a serial advanced technology attachment (SATA) bus, a nonvolatile memory express (NVMe) bus, a UFS bus, an eMMC bus, or the like.

In some example embodiments, the electronic system 100 may be any computing system, such as a personal computer (PC), a server computer, a data center, a workstation, a digital television, a set-top box, a navigation system, etc. In other example embodiments, the electronic system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

FIGS. 3A, 3B, 4A and 4B are diagrams for describing an operation of setting a plurality of context values in a disaggregated memory system according to example embodiments.

Figure 3A:
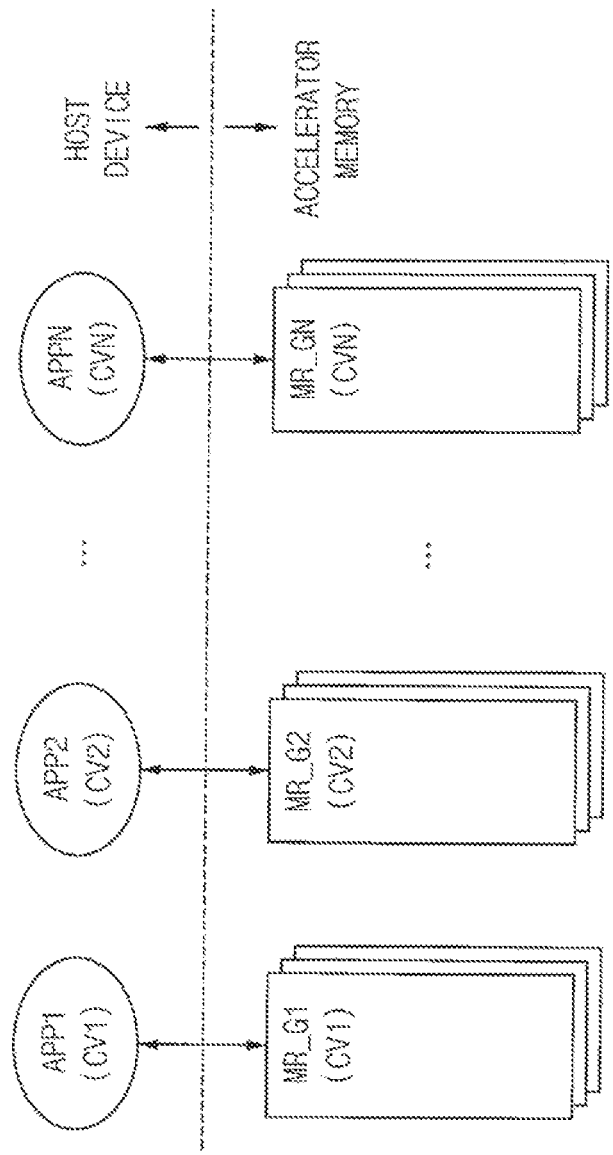
FIGS. 3A, 3B, 4A and 4B are diagrams for describing an operation of setting a plurality of context values in a disaggregated memory system according to example embodiments.

Referring to FIG. 3A, an example where a plurality of workloads correspond to a plurality of applications executed on or driven by a host device (e.g., the host device 200 in FIG. 2) is illustrated.

The plurality of workloads may include first to N-th workloads, where N is a natural number greater than or equal to two. For example, the plurality of workloads may include first to N-th applications APP1, APP2, . . . , APPN. The plurality of context values (e.g., the plurality of context values CV in FIG. 2) may include first to N-th context values CV1, CV2, . . . , CVN.

One of the first to N-th context values CV1 to CVN may be set or allocated for a respective one of the first to N-th applications APP1 to APPN, and different context values may be set for different applications. For example, the first context value CV1 may be set for the first application APP1, the second context value CV2 may be set for the second application APP2, and the N-th context value CV2 may be set for the N-th application APPN.

Each of the first to N-th applications APP1 to APPN may be allocated to at least one of a plurality of memory regions (e.g., the plurality of memory regions 322 in FIG. 2) depending on the types and characteristics of the first to N-th applications APP1 to APPN. For example, the first application APP1 may be allocated to a first memory region group MR_G1 including at least one memory region, the second application APP2 may be allocated to the second memory region group MR_G2 including at least another memory region, and the N-th application APPN may be allocated to the N-th memory region group MR_GN including at least another memory region.

In addition, in some example embodiments, each memory region may be allocated to a specific application by setting or allocating one of the first to N-th context values CV1 to CVN to a respective one of the plurality of memory regions. For example, the first context value CV1 corresponding to the first application APP1 may be set for the first memory region group MR_G1, the second context value CV2 corresponding to the second application APP2 may be set for the second memory region group MR_G2, and the N-th context value CVN corresponding to the N-th application APPN may be set for the N-th memory region group MR_GN.

In some example embodiments, each of the first to N-th applications APP1 to APPN may be referred to as an application program, and may be an application software program that is executed on an operating system. For example, each of the first to N-th applications APP1 to APPN may be programmed to aid in generating, copying and deleting a file. For example, each of the first to N-th applications APP1 to APPN may provide various services such as a video application, a game application, a web browser application, or the like. Each of the first to N-th applications APP1 to APPN may generate tasks, jobs and/or requests for using or accessing at least one memory region (e.g., for performing data write/read/erase operations on at least one memory region).

In some example embodiments, each of the first to N-th context values CV1 to CVN may be referred to as an identifier, and may be used to classify each workload (e.g., each application) and to classify a memory access by each workload. For example, each of the first to N-th context values CV1 to CVN may include a process/thread identification (ID), a transaction number, a query number, or the like, and may further include various types of identifiers according to a use case.

Figure 3B:
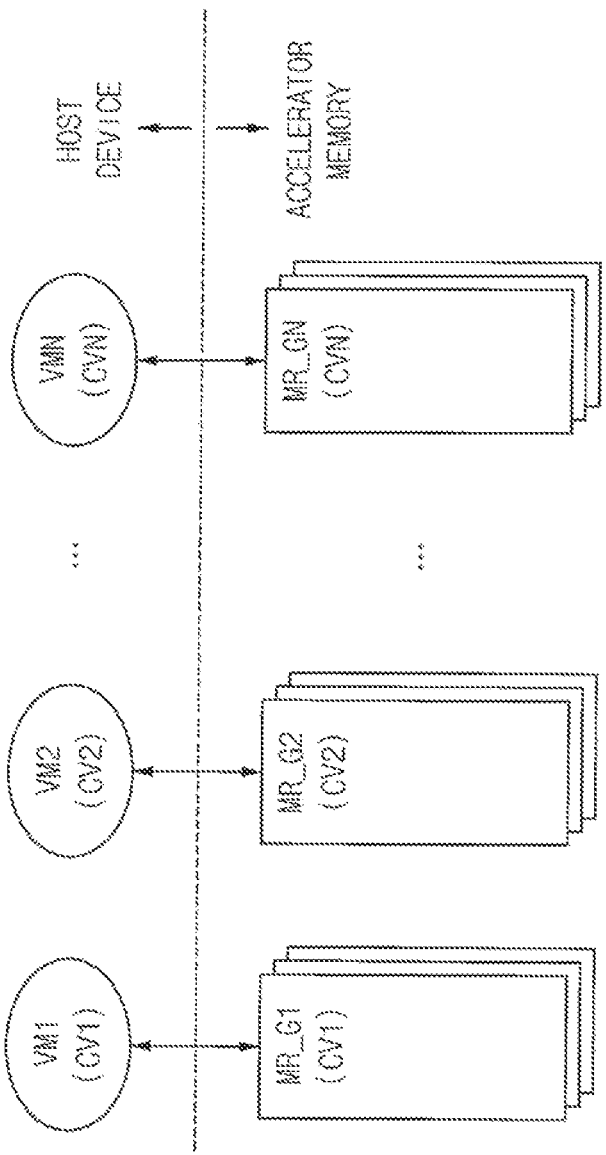

Referring to FIG. 3B, an example where a plurality of workloads correspond to a plurality of virtual machines executed on or driven by a host device (e.g., the host device 200 in FIG. 2) is illustrated. The descriptions repeated with FIG. 3A will be omitted for conciseness.

The plurality of workloads may include first to N-th virtual machines VM1, VM2, . . . , VMN. One of the first to N-th context values CV1 to CVN may be set or allocated for a respective one of the first to N-th virtual machines VM1 to VMN, and different context values may be set for different virtual machines.

Each of the first to N-th virtual machines VM1 to VMN may be allocated to at least one of a plurality of memory regions (e.g., the plurality of memory regions 322 in FIG. 2) depending on the types and characteristics of the first to N-th virtual machines VM1 to VMN. In addition, in some example embodiments, each memory region may be allocated to a specific virtual machine by setting or allocating one of the first to N-th context values CV1 to CVN to a respective one of the plurality of memory regions.

In some example embodiments, the host device may support a virtualization function. For example, each of the first to N-th virtual machines VM1 to VMN may be a virtualization core or processor generated by a virtualization operation, and may drive an operating system (OS) or an application independently. For example, the virtualization function and the virtualization operation may be performed using a VMware, a Single-Root IO Virtualization (SR-IOV), or the like. For example, an OS driven by a virtual machine may be referred to as, for example, a guest OS. Each of the first to N-th virtual machines VM1 to VMN may generate tasks, jobs and/or requests for using or accessing at least one memory region (e.g., for performing data write/read/erase operations on at least one memory region).

Figure 4A:
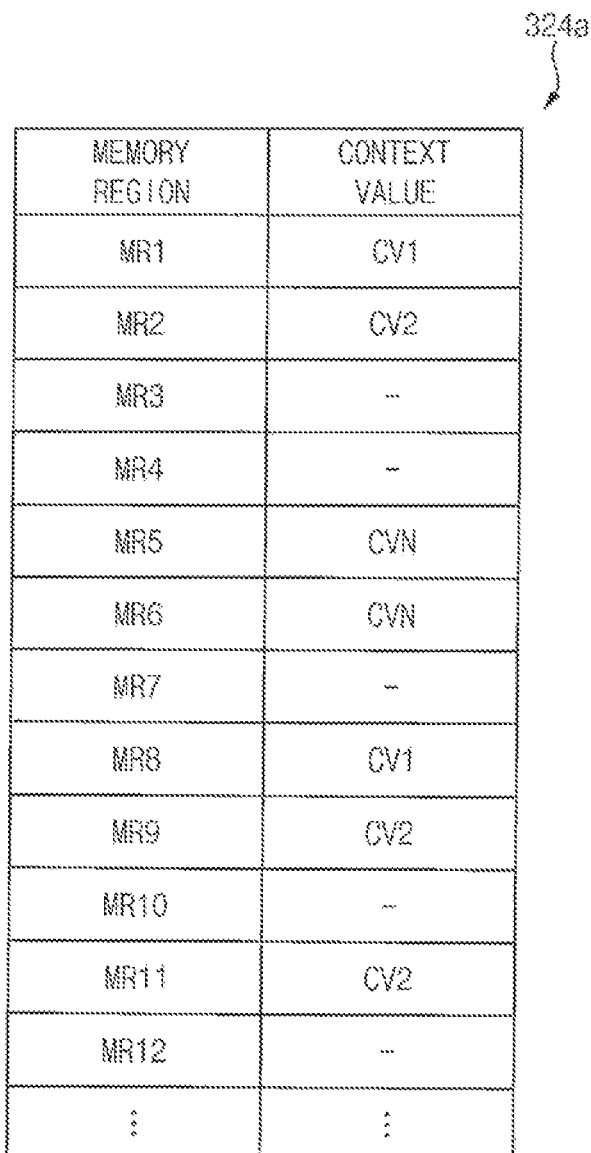

Referring to FIG. 4A, an example of a context table 324a, which is included in an accelerator memory (e.g., the accelerator memory 320 in FIG. 2) and is controlled and/or managed by a context manager (e.g., the context manager 312 in FIG. 2), is illustrated.

The context table 324a may include a relationship between a plurality of memory regions MR1, MR2, MR3, MR4, MR5, MR6, MR7, MR8, MR9, MR10, MR11 and MR12 and the context values CV1 to CVN set for the plurality of memory regions MR1 to MR12. For example, the first context value CV1 corresponding to the first workload (e.g., the first application APP1 in FIG. 3A or the first virtual machine VM1 in FIG. 3B) may be set for the memory regions MR1 and MR8 to which the first workload is allocated. The second context value CV2 corresponding to the second workload (e.g., the second application APP2 in FIG. 3A or the second virtual machine VM2 in FIG. 3B) may be set for the memory regions MR2, MR9 and MR11 to which the second workload is allocated. The N-th context value CVN corresponding to the N-th workload (e.g., the N-th application APPN in FIG. 3A or the N-th virtual machine VMN in FIG. 3B) may be set for the memory regions MR5 and MR6 to which the N-th workload is allocated. The memory regions MR3, MR4, MR7, MR10 and MR12 to which a context value is not set may represent memory regions to which a workload is not allocated yet or from which the workload is deallocated.

In some example embodiments, each of the plurality of memory regions MR1 to MR12 may correspond to one page or one memory block included in the accelerator memory (e.g., included in the nonvolatile memory).

In some example embodiments, the context manager may add, delete and/or change information or contents in the context table 324a. In other words, the context values CV1 to CVN for the plurality of memory regions MR1 to MR12 may be set, changed and/or released by the context manager.

In some example embodiments, a change of the information or contents in the context table 324a may be limitedly performed only when the ownership is changed. For example, when the memory allocation or ownership is changed, the host device may explicitly request to perform prefetch on a corresponding context.

Figure 4B:

Referring to FIG. 4B, another example of a context table 324b, which is included in an accelerator memory (e.g., the accelerator memory 320 in FIG. 2) and is controlled and/or managed by a context manager (e.g., the context manager 312 in FIG. 2), is illustrated. The descriptions repeated with FIG. 4A will be omitted.

The context table 324b may include a relationship between the plurality of memory regions MR1 to MR12 and bias values BV1 and BV2 set for the plurality of memory regions MR1 to MR12. For example, the first bias value BV1 (e.g., "1") may be set for the memory regions MR1, MR2, MR5, MR6, MR8, MR9 and MR11, and the second bias value BV2 (e.g., "0") may be set for the memory regions MR3 and MR4. A bias value may not be set for the memory regions MR7, MR10 and MR12. For example, the context values may be set for only memory regions to which the first bias value BV1 is set.

In some example embodiments, the context table 324b may be included in a CXL type2 device. The CXL type2 device may include a bias table that includes or represents a relationship between memory regions (e.g., pages) and bias values set thereto. Thus, the context table 324b may be easily implemented in the CXL type2 device by adding the context values set for the memory regions to the bias table.

Figure 5:
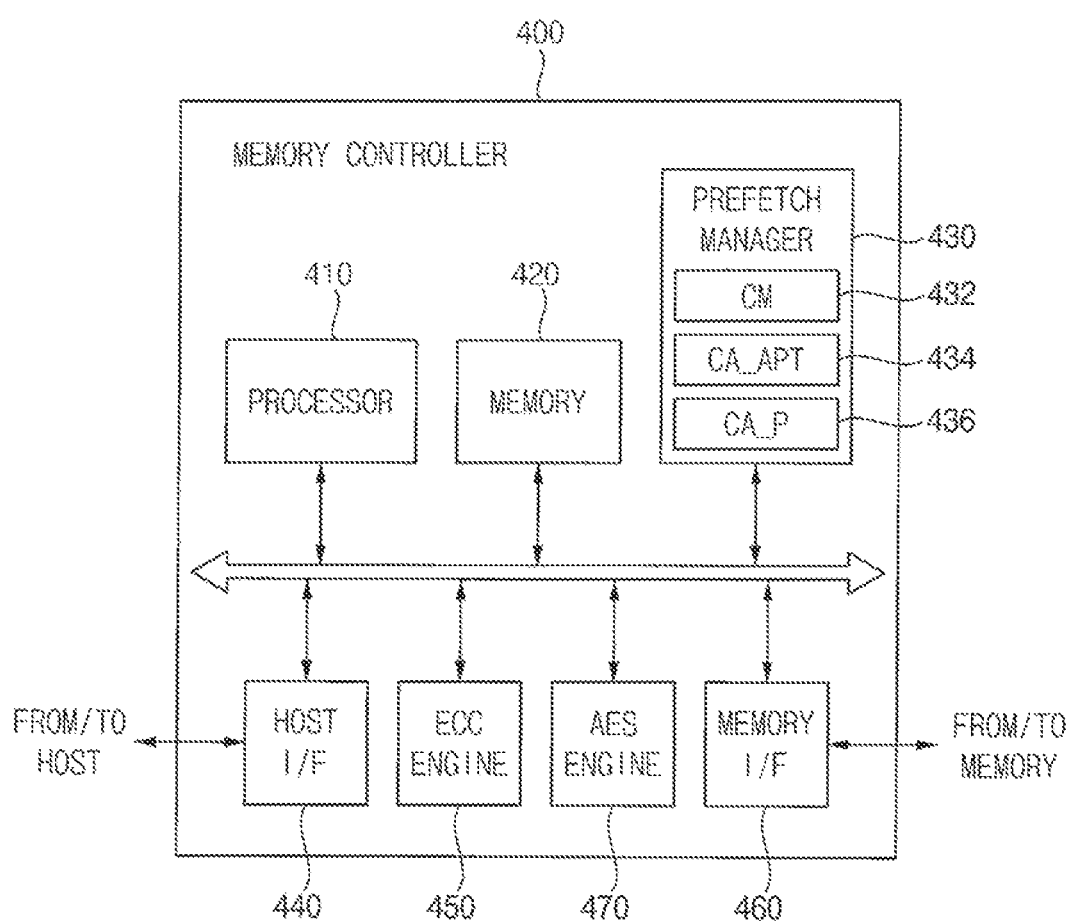
FIG. 5 is a block diagram illustrating an example of a memory controller included in a disaggregated memory system according to example embodiments.

FIG. 5 is a block diagram illustrating an example of a memory controller included in a disaggregated memory system according to example embodiments.

Referring to FIG. 5, a memory controller 400 may include a processor 410, a memory 420, a prefetch manager 430, a host interface (I/F) 440, an error correction code (ECC) engine 450, a memory interface (I/F) 460 and an advanced encryption standard (AES) engine 470.

The processor 410 may control an operation of the memory controller 400 in response to a command received via the host interface 440 from a host device (e.g., the host device 200 in FIG. 2). For example, the processor 410 may control an operation of a disaggregated memory system (e.g., the disaggregated memory system 300 in FIG. 2), and may control respective components by employing firmware for operating the disaggregated memory system.

The memory 420 may store instructions and data executed and processed by the processor 410. For example, the memory 420 may be implemented with a volatile memory, such as a DRAM, a static random access memory (SRAM), a cache memory, or the like.

The prefetch manager 430 may perform, manage and/or control the context-aware prefetch in the method of operating the disaggregated memory system according to example embodiments, and may include a context manager (CM) 432, a context-aware access pattern trainer (CA_APT) 434 and a context-aware prefetcher (CA_P) 436. The context manager 432, the context-aware access pattern trainer 434 and the context-aware prefetcher 436 may be substantially the same as the context manager 312, the context-aware access pattern trainer 314 and the context-aware prefetcher 316 in FIG. 2, respectively. In some example embodiments, at least a part of the prefetch manager 430 may be implemented as hardware. For example, at least a part of the prefetch manager 430 may be included in a computer-based electronic system. In other example embodiments, at least a part of the prefetch manager 430 may be implemented as instruction codes or program routines (e.g., a software program). For example, the instruction codes or the program routines may be executed by a computer-based electronic system, and may be stored in any storage device located inside or outside the computer-based electronic system.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like, or may perform ECC encoding and ECC decoding using the above-described codes or other error correction codes.

The host interface (I/F) 440 may provide physical connections between the host device and the disaggregated memory system. The host interface 440 may provide an interface corresponding to a bus format of the host device for communication between the host device and the disaggregated memory system.

The memory interface (I/F) 460 may exchange data with an accelerator memory (e.g., the accelerator memory 320 in FIG. 2). The memory interface 460 may transfer data to the accelerator memory, or may receive data read from the accelerator memory. For example, the memory interface 460 may be configured to comply with a standard protocol, such as Toggle or open NAND flash interface (ONFI), or the like.

The AES engine 470 may perform at least one of an encryption operation and a decryption operation on data input to the storage controller 400 by using a symmetric-key algorithm. Although not illustrated in detail, the AES engine 470 may include an encryption module and a decryption module. For example, the encryption module and the decryption module may be implemented as separate modules. For another example, one module capable of performing both encryption and decryption operations may be implemented in the AES engine 470.

Figure 6:
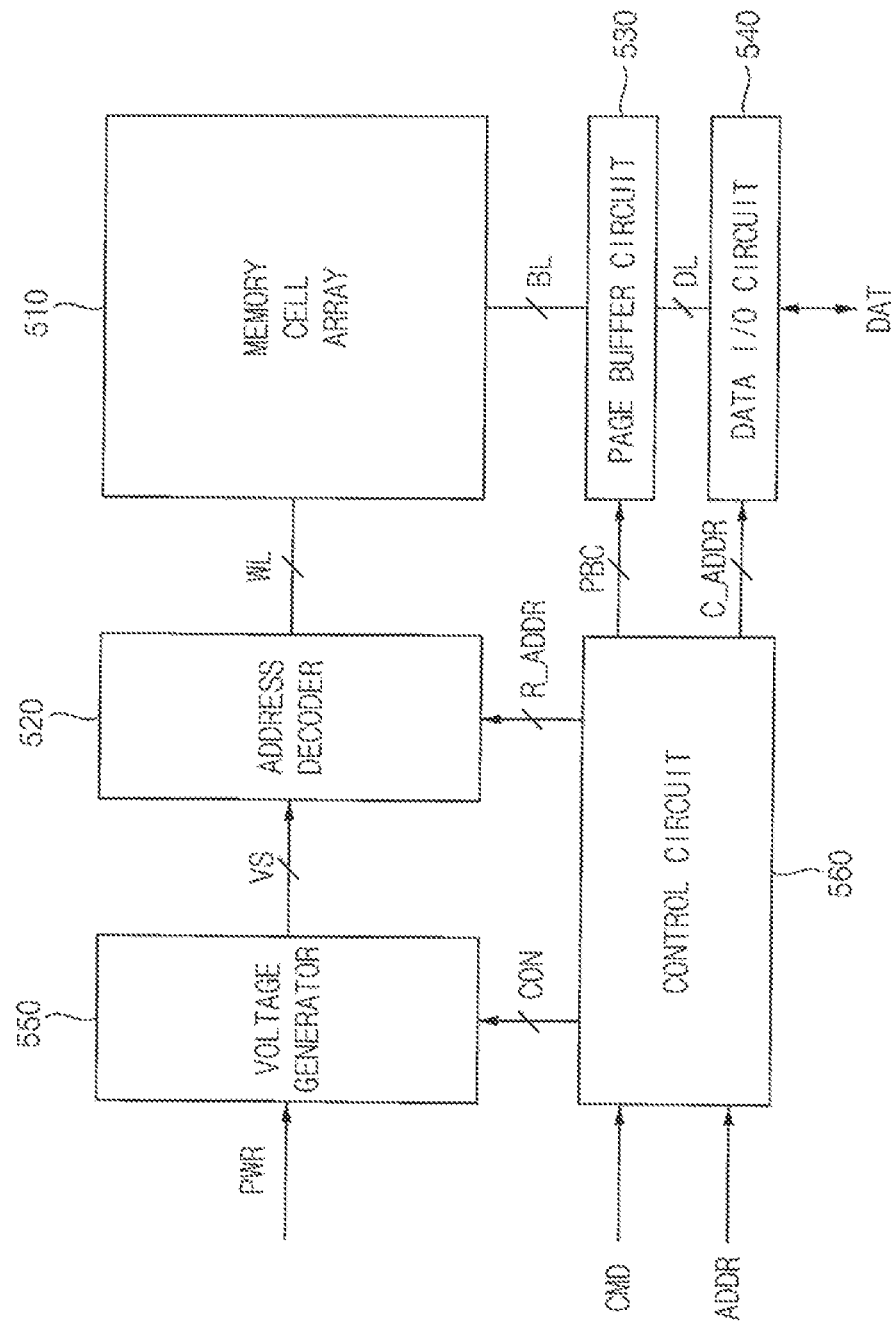
FIG. 6 is a block diagram illustrating an example of an accelerator memory included in a disaggregated memory system according to example embodiments.

FIG. 6 is a block diagram illustrating an example of an accelerator memory included in a disaggregated memory system according to example embodiments.

Referring to FIG. 6, an accelerator memory 500 may include a memory cell array 510, an address decoder 520, a page buffer circuit 530, a data input/output (I/O) circuit 540, a voltage generator 550 and a control circuit 560. For example, the accelerator memory 500 may be implemented in the form of a nonvolatile memory.

The memory cell array 510 may be connected to the address decoder 520 via a plurality of wordlines WL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. For example, the memory cell array 510 may be divided into a plurality of memory blocks each of which includes memory cells. In addition, each memory block may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell.

The control circuit 560 may receive a command CMD and an address ADDR from an outside (e.g., from the memory controller 310 in FIG. 2), and may control erasure, programming and read operations of the accelerator memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540. In some example embodiments, the control circuit 560 may include the context table 324, the memory access log 324 and the prefetch target buffer 328.

The address decoder 520 may be connected to the memory cell array 510 via the plurality of wordlines WL. For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

The voltage generator 550 may generate voltages VS that are used for operation of the accelerator memory 500 based on a power PWR and the control signals CON. The voltages VS may be applied to the plurality of wordlines WL via the address decoder 520.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the accelerator memory 500.

The data I/O circuit 540 may be connected to the page buffer circuit 530 via data lines DL. The data I/O circuit 540 may provide the data DAT from the outside of the accelerator memory 500 to the memory cell array 510 via the page buffer circuit 530 or may provide the data DAT from the memory cell array 510 to the outside of the accelerator memory 500, based on the column address C_ADDR.

FIGS. 7A, 7B, 7C, 7D and 7E are circuit diagrams illustrating examples of a memory cell array included in an accelerator memory of FIG. 6.

Figure 7A:
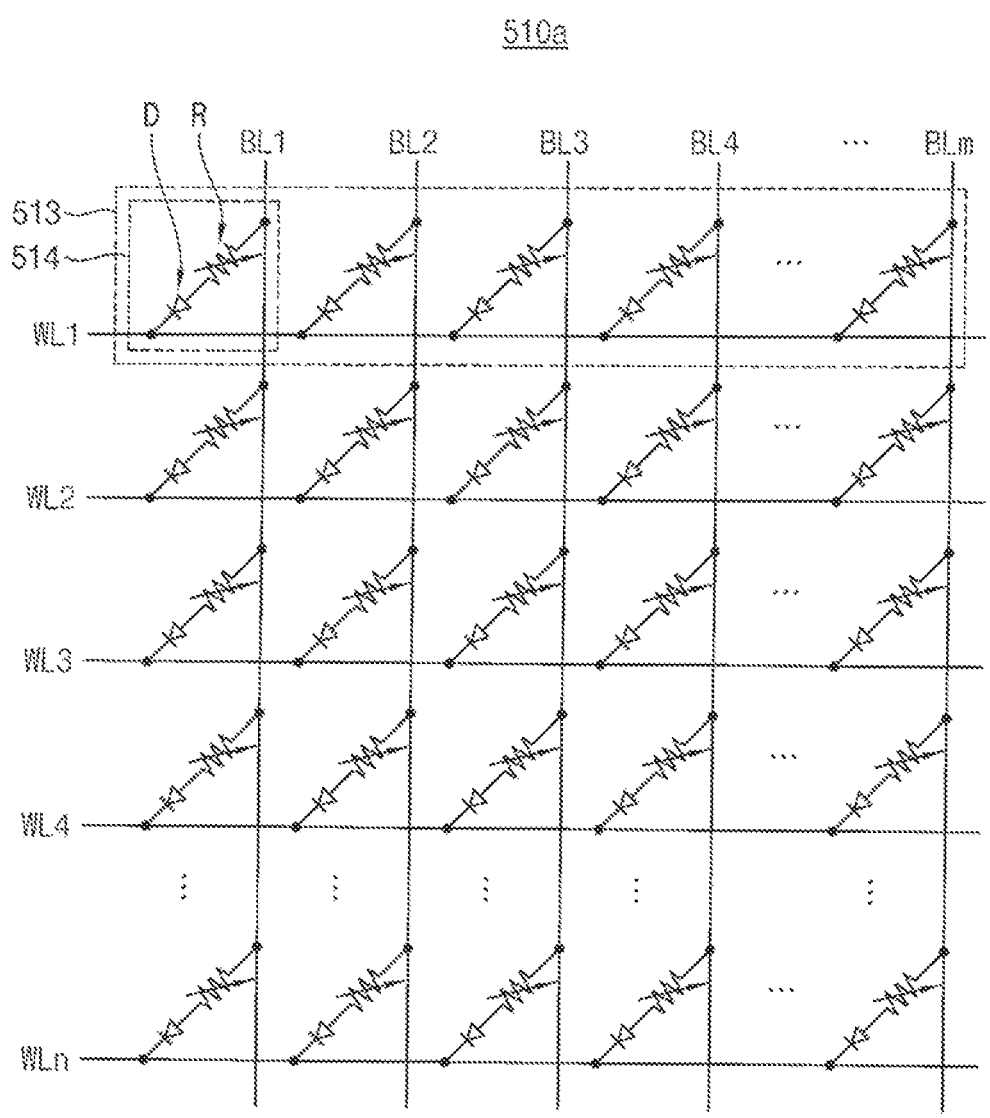

Referring to FIG. 7A, an example of a memory cell array 510a included in the accelerator memory 500 of FIG. 6, which is a PRAM, is illustrated.

The memory cell array 510a may include a plurality of memory blocks, and FIG. 7A illustrates one memory block.

The memory cell array 510a may include a plurality of wordlines WL1, WL2, WL3, WL4, . . . , WLn, a plurality of bitlines BL1, BL2, BL3, BL4, . . . , BLm, and a plurality of memory cells 514. The memory cells 514 connected to the same wordline may be defined as a page unit 513.

Each of the memory cells 514 may include a variable resistor R and a selection device D. Here, the variable resistor R may be referred to as a variable resistor element and/or a variable resistor material, and the selection device D may be referred to as a switching element. The variable resistor R may be connected between one of the bitlines BL1 to BLm and the selection device D, and the selection device D may be connected between the variable resistor R and one of the wordlines WL1 to WLn.

A resistance of the variable resistor R may be changed to one of multiple resistive states. For example, the resistance of the variable resistor R may change in response to an electric pulse being applied to the corresponding variable resistor R.

In some example embodiments, the variable resistor R may include phase change material. The phase change material may have an amorphous state that is relatively high-resistive, and a crystal state that is relatively low-resistive. A phase of the phase change material may be changed by Joule heat that is generated by the current. Using the changes of the phase, data may be written to the corresponding memory cell 514.

The selection device D may be connected between one of the wordlines WL1 to WLn and the variable resistor R, and according to a voltage applied to the connected wordline and bitline, a current that is supplied to the variable resistor R is controlled. For example, the selection device D may be a PN junction diode or a PIN junction diode. An anode electrode of the diode may be connected to the variable resistor R, and a cathode electrode of the diode may be connected to one of the wordlines WL1 to WLn. Here, when a voltage difference between the anode electrode and the cathode electrode of the diode is greater than a threshold voltage of the diode, the diode may be turned on so that the current is supplied to the variable resistor R.

Figure 7B:
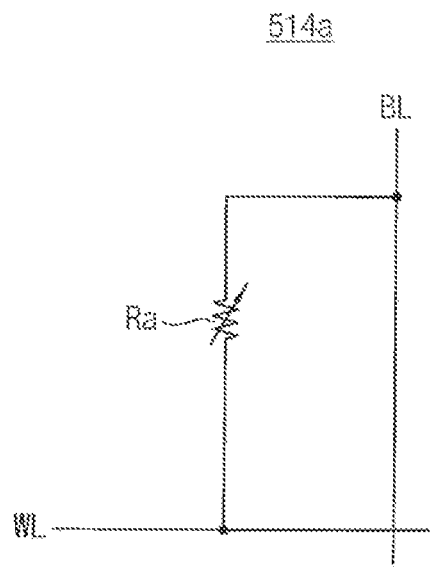
Figure 7C:
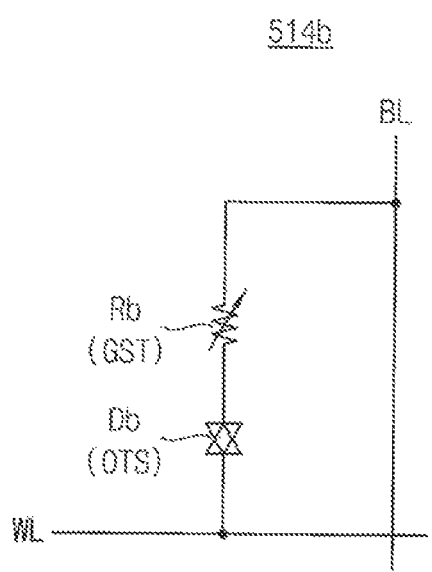
Figure 7D:
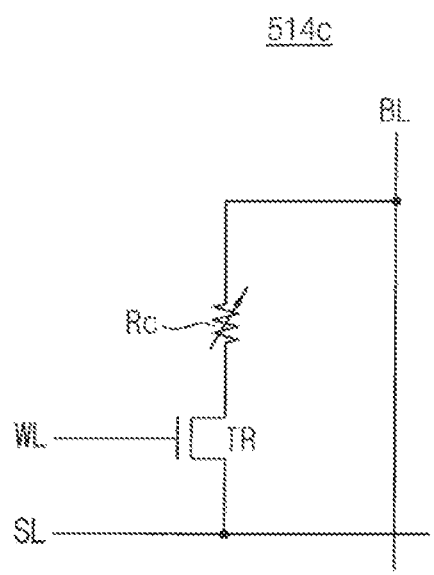

Referring to FIGS. 7B, 7C and 7D, examples of memory cells 514a, 514b and 514c included in the memory cell array 510a of FIG. 7A are illustrated.

The memory cell 514a of FIG. 7B may include a variable resistor Ra connected between, e.g. directly connected between, a bitline BL and a wordline WL. The memory cell 514a may store data due to voltages that are applied to the bitline BL and the wordline WL, respectively.

The memory cell 514b of FIG. 7C may include a variable resistor Rb and a bidirectional diode Db. The variable resistor Rb may include a resistive material so as to store data. The bidirectional diode Db may be connected between, e.g. directly connected between, the variable resistor Rb and a wordline WL, and the variable resistor Rb may be connected between, e.g. directly connected between, a bitline BL and the bidirectional diode Db. Alternatively, positions of the bidirectional diode Db and the variable resistor Rb may be changed with respect to each other. By using the bidirectional diode Db, the leakage current flowing through a non-selected resistor cell may be cut (e.g., eliminated or reduced). The variable resistor Rb may include phase change material such as GeSbTe (GST), and the bidirectional diode Db may include an ovonic threshold switch (OTS).

The memory cell 514c of FIG. 7D may include a variable resistor Rc and a transistor TR. The transistor TR may be a selection device (e.g., a switching device), which supplies or cuts a current to the variable resistor Rc, according to a voltage of a wordline WL. As illustrated in FIG. 7D, in addition to the wordline WL, a source line SL may be additionally arranged to adjust voltage levels at both ends of the variable resistor Rc. The transistor TR may be connected between the variable resistor Rc and the source line SL, and the variable resistor Rc may be connected between (e.g. directly connected between) a bitline BL and the transistor TR. Alternatively, positions of the transistor TR and the variable resistor Rc may be changed with respect to each other. The memory cell 514c may be selected or non-selected according to the ON or OFF state of the transistor TR that is driven by the wordline WL.

Referring to FIG. 7E, an example of a memory cell array 510b included in the accelerator memory 500 of FIG. 6, which is a NAND flash memory, is illustrated.

The memory cell array 510b may include a plurality of memory blocks, and FIG. 7E illustrates one memory block by way of example for conciseness.

The memory cell array 510b may be formed on a substrate in a three-dimensional structure (or a vertical structure). For example, a plurality of NAND strings included in the memory cell array 510b may be formed in a direction perpendicular to the substrate.

The memory cell array 510b may include a plurality of NAND strings NS11, NS12, NS13, NS21, NS22, NS23, NS31, NS32 and NS33 connected between bitlines BL1, BL2 and BL3 and a common source line CSL. Each of the NAND strings NS11 to NS33 may include a string selection transistor SST, a plurality of memory cells MC1, MC2, MC3, MC4, MC5, MC6, MC7 and MC8, and a ground selection transistor GST.

Each string selection transistor SST may be connected to a corresponding string selection line (e.g., one of SSL1, SSL2 and SSL3). The plurality of memory cells MC1 to MC8 may be connected to corresponding wordlines WL1, WL2, WL3, WL4, WL5, WL6, WL7 and WL8, respectively. Each ground selection transistor GST may be connected to a corresponding ground selection line (e.g., one of GSL1, GSL2 and GSL3). Each string selection transistor SST may be connected to a corresponding bitline (e.g., one of BL1 to BL3), and each ground selection transistor GST may be connected to the common source line CSL.

The cell strings connected in common to one bitline may form one column, and the cell strings connected to one string selection line may form one row. For example, the cell strings NS11, NS21 and NS31 connected to the first bitline BL1 may correspond to a first column, and the cell strings NS11, NS12 and NS13 connected to the first string selection line SSL1 may form a first row.

A three-dimensional vertical array structure may include vertical NAND strings that are vertically oriented such that at least one memory cell is located over another memory cell. The at least one memory cell may comprise a charge trap layer. The following patent documents, which are hereby incorporated by reference in their entirety, describe non-limiting examples of suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

Although the accelerator memory included in the disaggregated memory system according to example embodiments is described based on a PRAM and a NAND flash memory, example embodiments are not limited thereto. For example, the accelerator memory may include any nonvolatile memory, e.g., an RRAM, an MRAM, an FRAM, a NGFM, a PoRAM, or the like. Alternatively, the accelerator memory may include a volatile memory.

Figure 9:
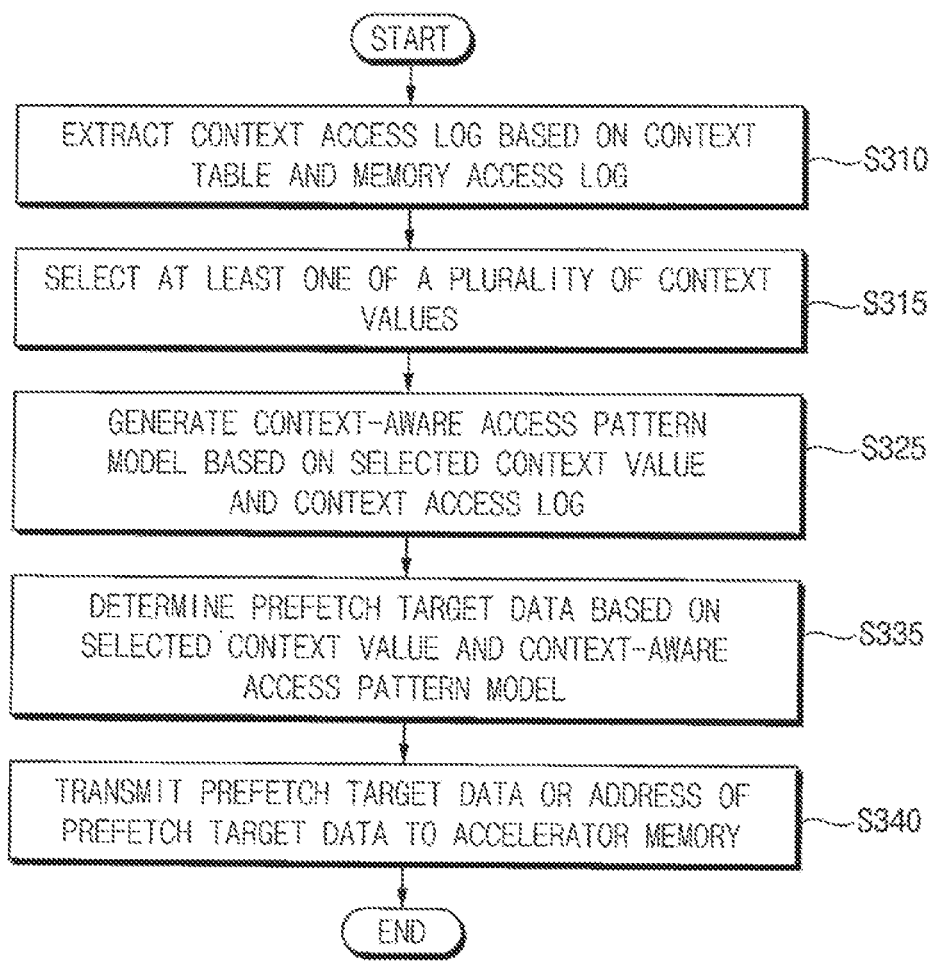

FIGS. 8 and 9 are flowcharts illustrating examples of selecting prefetch target data in FIG. 1.

Referring to FIGS. 1 and 8, when transmitting the prefetch information associated with the prefetch target data to the accelerator memory by selecting the prefetch target data based on the context table and the memory access log (step S300), a context access log may be extracted based on the context table and the memory access log (step S310). For example, step S310 may be performed by the context-aware access pattern trainer 314 in FIG. 2. For example, in some example embodiments, the context-aware access pattern trainer 314 may issue a command CMD to the accelerator memory for information stored in the context table and the memory access log, and may receive the information stored in the context table and the memory access log from the accelerator memory, and may extract the context access log based on the information from the context table and the memory access log.

In some example embodiments, the memory access log may include a history of recent accesses to the plurality of memory regions based on a current time point, and the context access log may include a history of recent accesses to the plurality of contexts.

In some example embodiments, the context access log may be extracted for all of the plurality of workloads. In other words, a history of context accesses and/or a history of memory accesses may be extracted for each workload and/or each context.

A context-aware access pattern model may be generated based on the context access log (step S320). The prefetch target data may be determined based on the context-aware access pattern model (step S330). For example, step S320 may be performed by the context-aware access pattern trainer 314 in FIG. 2, and step S330 may be performed by the context-aware prefetcher 316 in FIG. 2.

In some example embodiments, steps S320 and S330 may be performed based on an address map pattern prefetch scheme and/or a distance prefetch scheme. Both of the address map pattern prefetch scheme and the distance prefetch scheme may generate an access pattern based on a memory access log. For example, in the address map pattern prefetch scheme, an access log for each memory zone may be collected in units of cache lines, an access pattern may be inferred based on the access log, and a stride prefetch may be performed based on the access pattern.

In some example embodiments, steps S320 and S330 may be performed based on a request from the host device. In other example embodiments, steps S320 and S330 may be performed periodically (e.g., every predetermined period).

In some example embodiments, in step S320, the context-aware access pattern model may be generated for all or some of the plurality of workloads. In step S330, the prefetch target data may be determined for all or some of the plurality of workloads.

The prefetch target data or an address of the prefetch target data may be transmitted as the prefetch information to the accelerator memory (step S340).

Referring to FIGS. 1 and 9, when transmitting the prefetch information associated with the prefetch target data to the accelerator memory by selecting the prefetch target data based on the context table and the memory access log (step S300), steps S310 and S340 may be substantially the same as steps S310 and S340 in FIG. 8, respectively, and thus a repeated description thereof is omitted for conciseness.

At least one of the plurality of context values may be selected (step S315). A context-aware access pattern model may be generated based on the selected context value and the context access log (step S325). The prefetch target data may be determined based on the selected context value and the context-aware access pattern model (step S335).

Steps S325 and S335 may be substantially the same as steps S320 and S330 in FIG. 8, respectively, except that the selected context value is additionally used. In other words, in step S325, the context-aware access pattern model may be generated only for a selected workload corresponding to the selected context value among the plurality of workloads. In step S335, the prefetch target data may be determined only for the selected workload.

Figure 10:
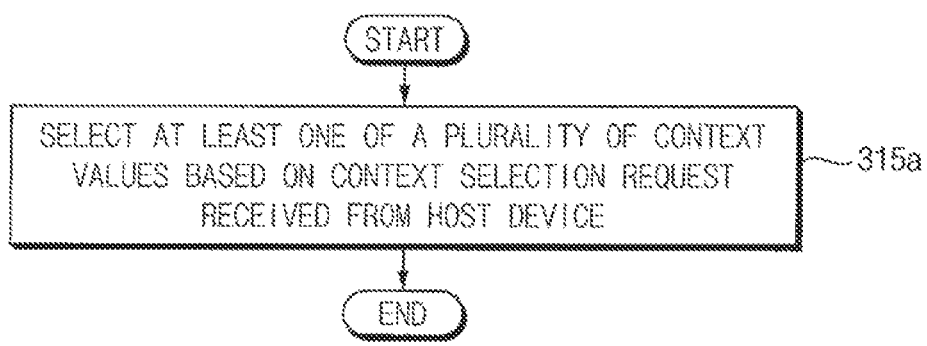
FIGS. 10 and 11 are flowcharts illustrating examples of selecting at least one of a plurality of context values in the examples of FIG. 9, according to various example embodiments.
Figure 11:
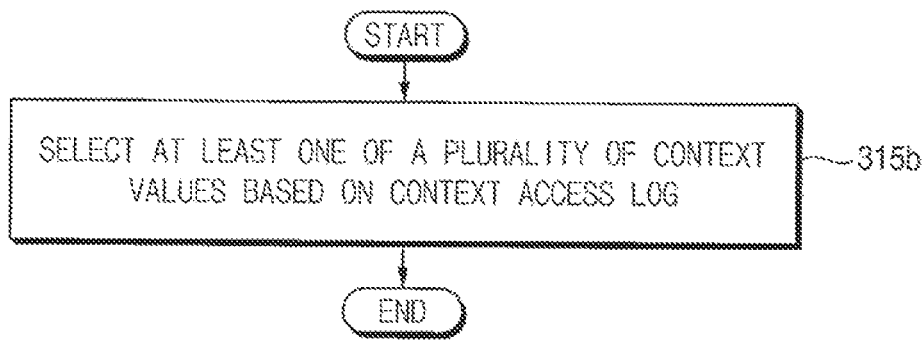

FIGS. 10 and 11 are flowcharts illustrating examples of selecting at least one of a plurality of context values in FIG. 9.

Referring to FIGS. 9 and 10, when selecting the at least one of the plurality of context values (step S315), the at least one of the plurality of context values may be selected based on a context selection request received from the host device (step S315a). In other words, the context-aware access pattern model may be generated by selecting only the context explicitly requested by the host device.

Referring to FIGS. 9 and 11, when selecting the at least one of the plurality of context values (step S315), the at least one of the plurality of context values may be selected based on the context access log (step S315b). For example, among the plurality of context values, a context value having access counts more than a reference count may be selected. In other words, the context-aware access pattern model may be generated by selecting only the context recently actively accessed.

Figure 12:
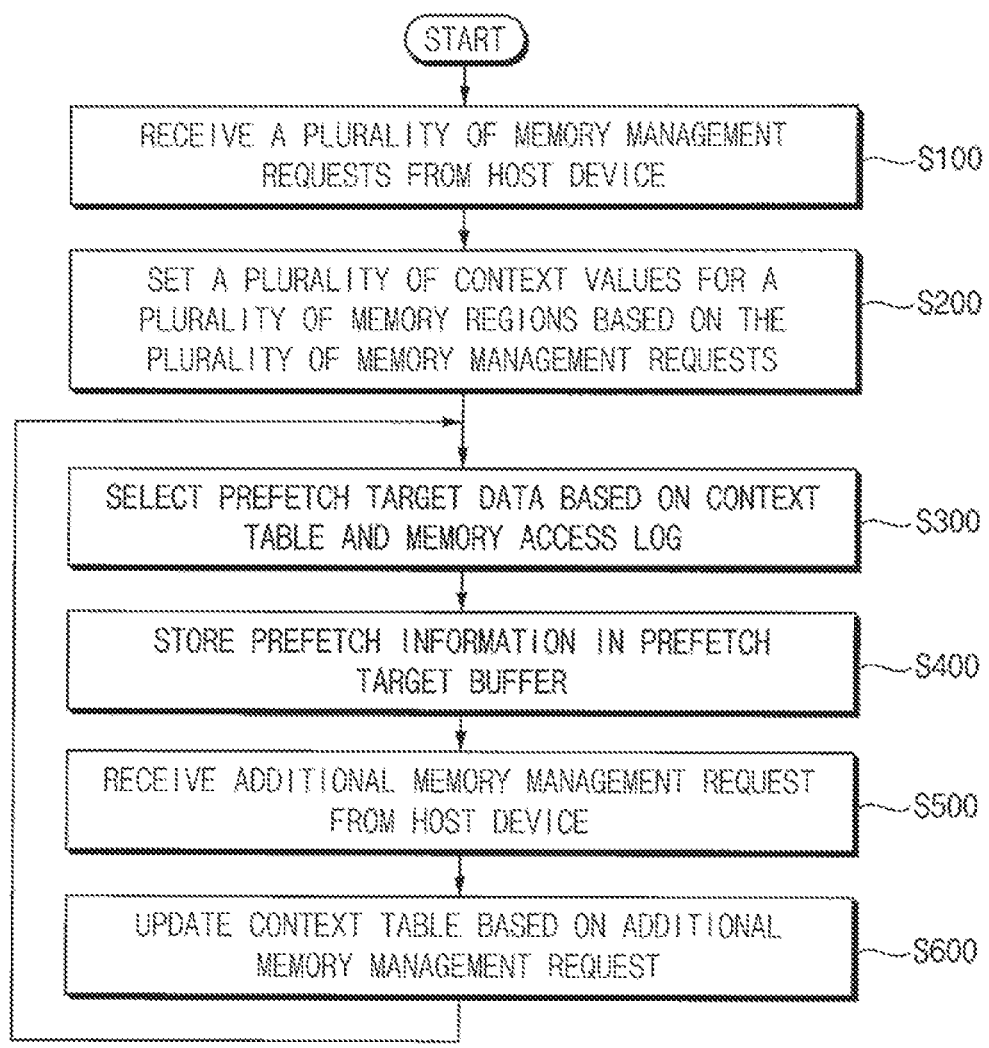
FIG. 12 is a flowchart illustrating a method of operating a disaggregated memory system according to example embodiments.

FIG. 12 is a flowchart illustrating a method of operating a disaggregated memory system according to example embodiments. The descriptions repeated with FIG. 1 will be omitted for conciseness.

Referring to FIG. 12, in a method of operating a disaggregated memory system according to example embodiments, steps S100, S200, S300 and S400 may be substantially the same as steps S100, S200, S300 and S400 of FIG. 1, respectively.

The memory controller may receive at least one additional memory management request from the host device (step S500). The at least one additional memory management request may include at least one of the plurality of context values. The memory controller may transmit the at least one of the plurality of context values to the accelerator memory such that the context table is updated based on the at least one additional memory management request (step S600). The additional memory management request may be similar to the plurality of memory management requests in step S100. Steps S500 and S600 may be similar to steps S100 and S200, respectively.

Steps S300 and S400 may be performed again based on the updated context table.

In some example embodiments, steps S300, S400, S500 and S600 may be continuously and/or repeatedly performed while the disaggregated memory system is operating or driving. In other words, the operations of adding, deleting and/or changing the information in the context table and the context-aware prefetch based thereon may be performed in real time (or during runtime or online) while the disaggregated memory system is operating.

Figure 13:
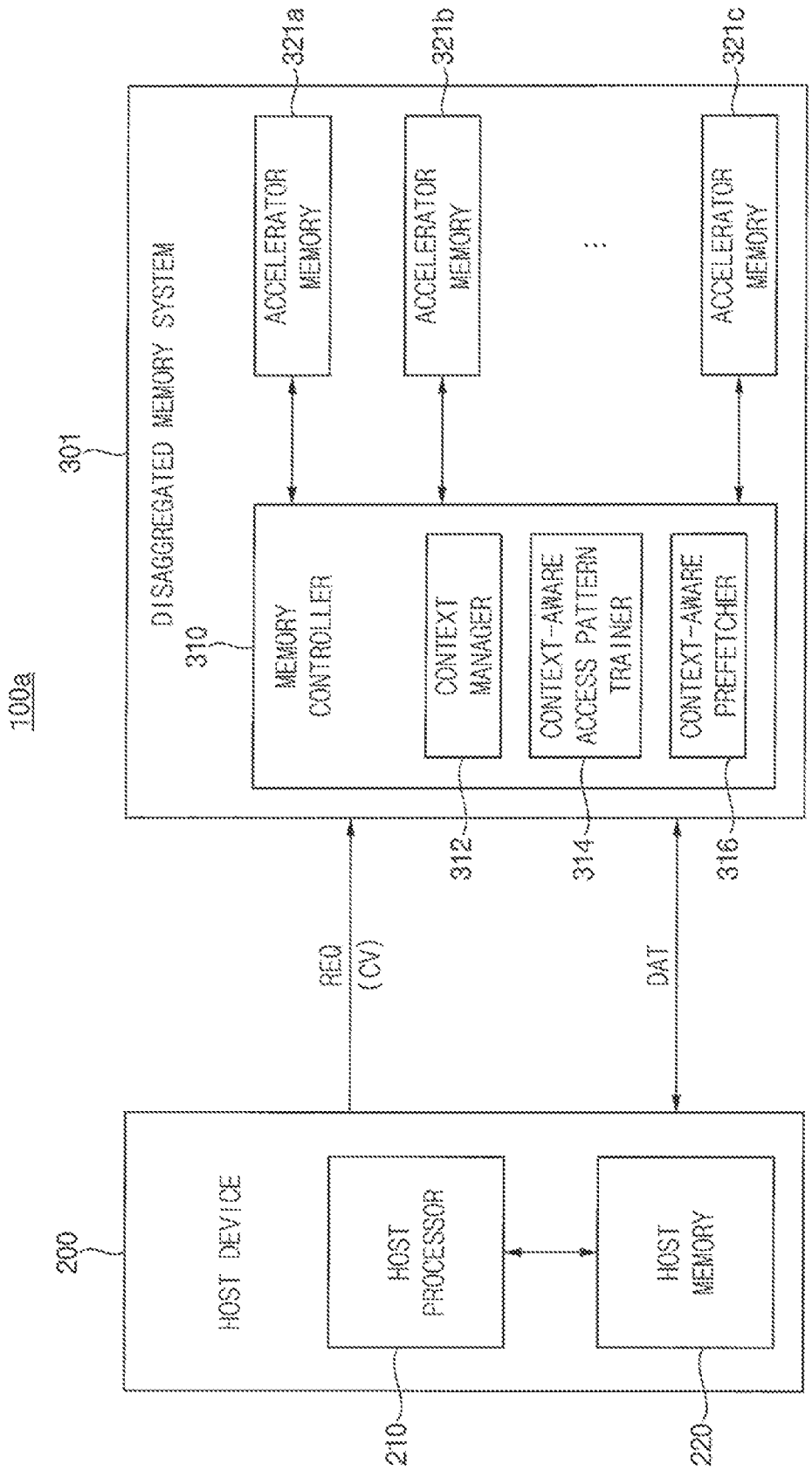
FIGS. 13 and 14 are block diagrams illustrating a disaggregated memory system and an electronic system including the disaggregated memory system according to various example embodiments.
Figure 14:
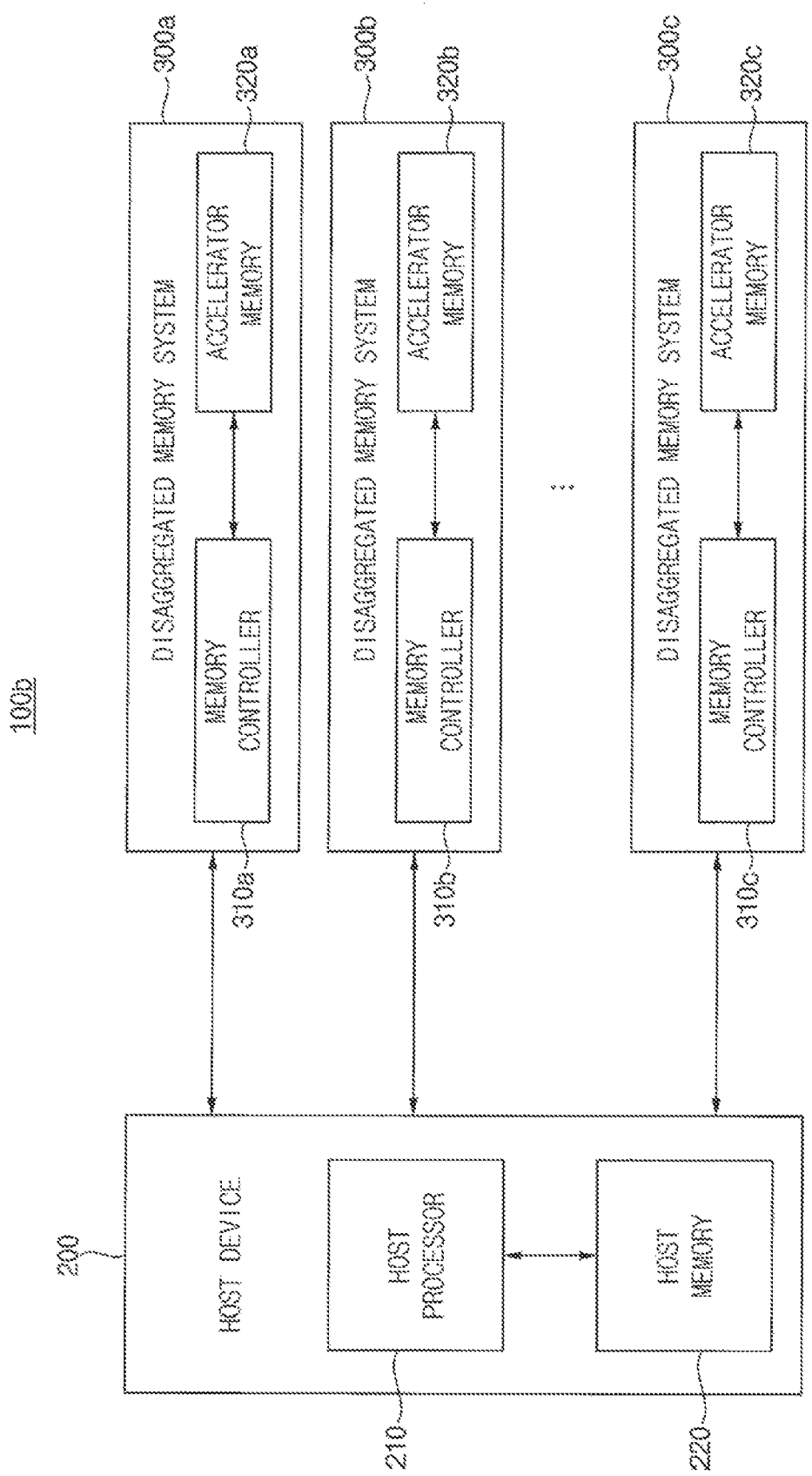

FIGS. 13 and 14 are block diagrams illustrating examples of a disaggregated memory system and an electronic system including the disaggregated memory system according to example embodiments. The descriptions repeated with FIG. 2 will be omitted for conciseness.

Referring to FIG. 13, an electronic system 100a may include a host device 200 and a disaggregated memory system 301. The disaggregated memory system 301 may include a memory controller 310 and a plurality of accelerator memories 321a, 321b and 321c.

The electronic system 100a may be substantially the same as the electronic system 100 of FIG. 2, except that the disaggregated memory system 301 includes the plurality of accelerator memories 321a, 321b and 321c. Each of the plurality of accelerator memories 321a, 321b and 321c may be substantially the same as the accelerator memory 320 in FIG. 2. The memory controller 310 may individually and/or independently control the plurality of accelerator memories 321a, 321b and 321c.

Referring to FIG. 14, an electronic system 100b may include a host device 200 and a plurality of disaggregated memory systems 300a, 300b and 300c. Each of the plurality of disaggregated memory systems 300a, 300b and 300c may include a respective one of a plurality of memory controllers 310a, 310b and 310c and a respective one of a plurality of accelerator memories 320a, 320b and 320c. For example, the disaggregated memory system 300a may include the memory controller 310a and the accelerator memory 320a, and so on.

The electronic system 100b may be substantially the same as the electronic system 100 of FIG. 2, except that the electronic system 100b includes the plurality of disaggregated memory systems 300a, 300b and 300c. Each of the plurality of disaggregated memory systems 300a, 300b and 300c may be substantially the same as the disaggregated memory system 300 in FIG. 2. In some example embodiments, each of the plurality of disaggregated memory systems 300a, 300b and 300c may include a plurality of accelerator memories, as described with reference to FIG. 13.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 15:
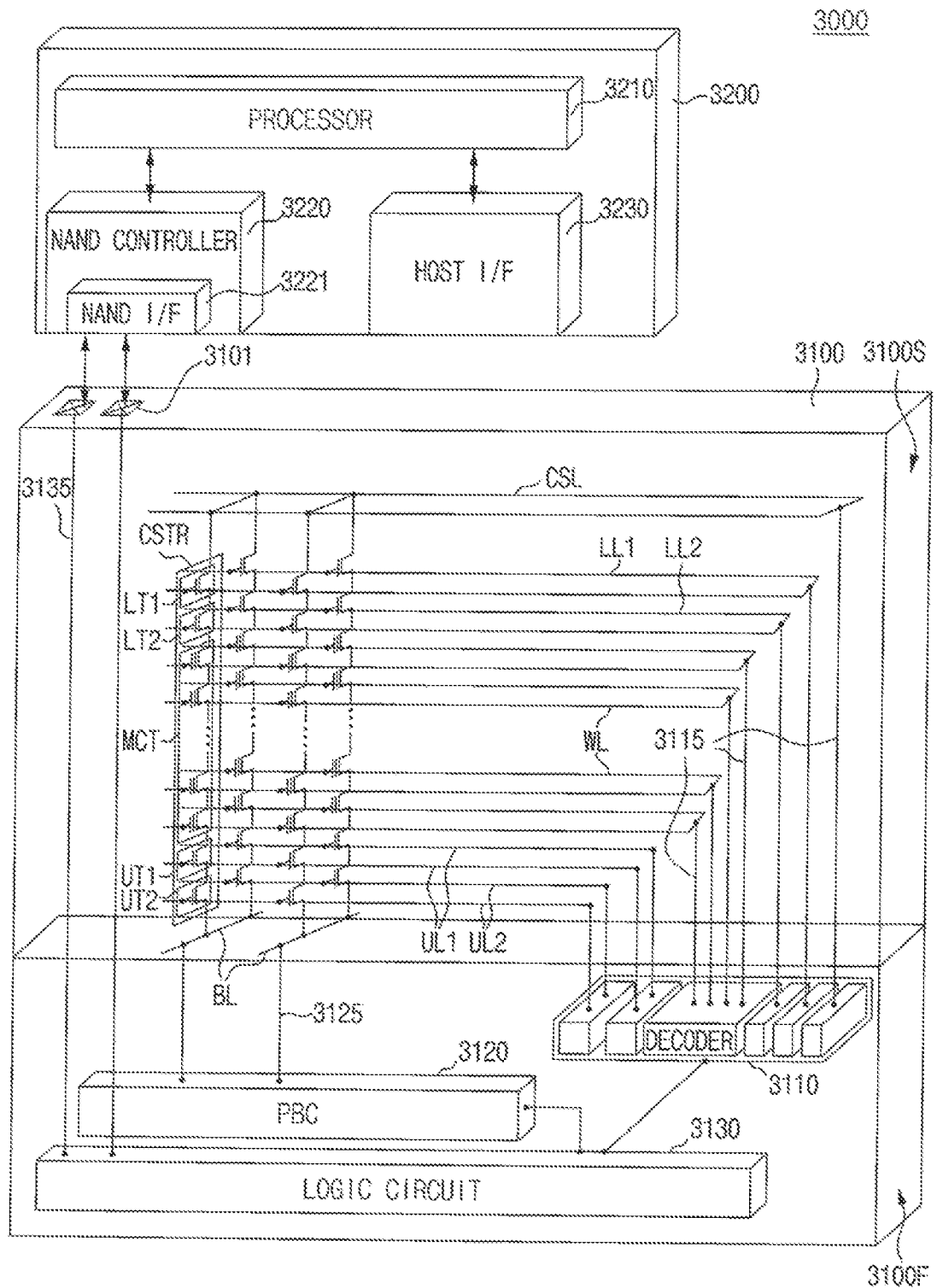
FIG. 15 is a block diagram illustrating an electronic system including a disaggregated memory system according to example embodiments.

FIG. 15 is a block diagram illustrating an electronic system including a disaggregated memory system according to example embodiments.

Referring to FIG. 15, an electronic system 3000 may include a semiconductor device 3100 and a controller 3200 electrically connected to the semiconductor device 3100. The electronic system 3000 may be a storage device including one or a plurality of semiconductor devices 3100 or an electronic device including the storage device. For example, the electronic system 3000 may be a solid state drive (SSD) device, a universal serial bus (USB), a computing system, a medical device, or a communication device that may include one or a plurality of semiconductor devices 3100. In other words, FIG. 15 illustrates an example where the disaggregated memory system according to example embodiments is implemented as a storage device.

The semiconductor device 3100 may be a memory device, for example, the accelerator memory included in the disaggregated memory system according to example embodiments. For example, the semiconductor device 3100 may be the nonvolatile memory device described with reference to FIGS. 6 and 7E. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including bitlines BL, a common source line CSL, wordlines WL, first and second upper gate lines UL1 and UL2, first and second lower gate lines LL1 and LL2, and memory cell strings CSTR between the bitlines BL and the common source line CSL.

In the second structure 3100S, each of the memory cell strings CSTR may include lower transistors LT1 and LT2 adjacent to the common source line CSL, upper transistors UT1 and UT2 adjacent to the bitlines BL, and a plurality of memory cell transistors MCT between the lower transistors LT1 and LT2 and the upper transistors UT1 and UT2.

In the first structure 3100F, the decoder circuit 3110, the page buffer circuit 3120 and the logic circuit 3130 may correspond to the address decoder 520, the page buffer circuit 530 and the control circuit 560 in FIG. 6, respectively.

The common source line CSL, the first and second lower gate lines LL1 and LL2, the wordlines WL, and the first and second upper gate lines UL1 and UL2 may be electrically connected to the decoder circuit 3110 through first connection wirings 1115 extending to the second structure 3110S in the first structure 3100F. The bitlines BL may be electrically connected to the page buffer circuit 3120 through second connection wirings 3125 extending to the second structure 3100S in the first structure 3100F. The input/output pad 3101 may be electrically connected to the logic circuit 3130 through an input/output connection wiring 3135 extending to the second structure 3100S in the first structure 3100F.

The controller 3200 may be the memory controller included in the disaggregated memory system according to example embodiments. The controller 3200 may include a processor 3210, a NAND controller 3220 and a host interface 3230. The host interface 3230 may interface with a host (not illustrated in FIG. 15). The electronic system 3000 may include a plurality of semiconductor devices 3100, and in this case, the controller 3200 may control the plurality of semiconductor devices 3100. The processor 3210, a NAND interface 3221 included in the NAND controller 3220, and the host interface 3230 may correspond to the processor 410, the memory interface 460 and the host interface 440 in FIG. 5, respectively.

Figure 16:
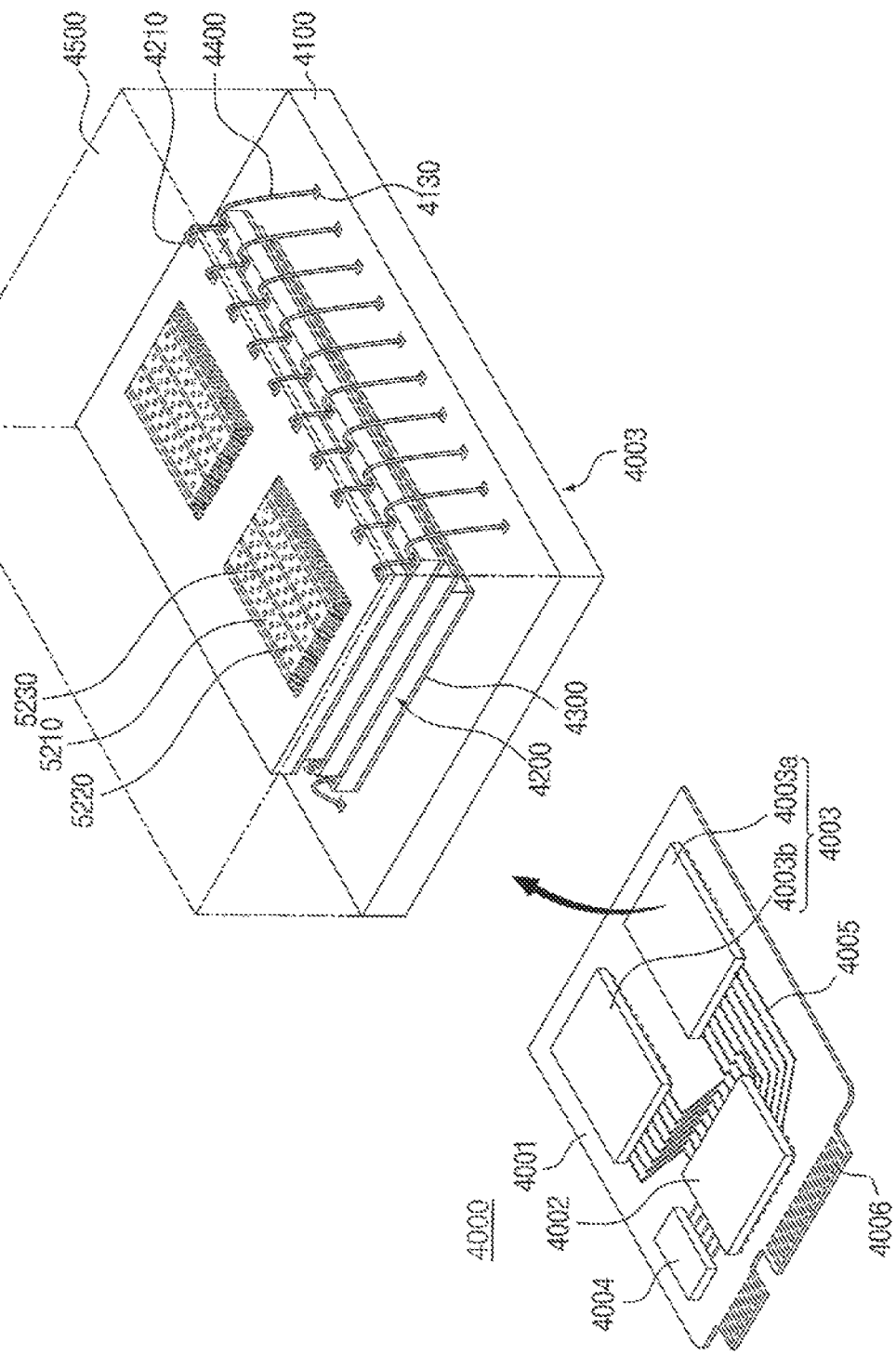
FIG. 16 is a perspective view of an electronic system including a disaggregated memory system according to example embodiments.

FIG. 16 is a perspective view of an electronic system including a disaggregated memory system according to example embodiments.

Referring to FIG. 16, an electronic system 4000 may include a main substrate 4001, a controller 4002 mounted on the main substrate 4001, at least one semiconductor package 4003, and a dynamic random access memory (DRAM) device 4004. The semiconductor package 4003 and the DRAM device 4004 may be connected to the controller 4002 by wiring patterns 4005 on the main substrate 4001.

The main substrate 4001 may include a connector 4006 having a plurality of pins connected to an external host. The number and layout of the plurality pins in the connector 4006 may be changed depending on a communication interface between the electronic system 4000 and the external host. In some example embodiments, the electronic system 4000 may be driven or may operate by a power source provided from the external host through the connector 4006.

The controller 4002 may be the memory controller included in the disaggregated memory system according to example embodiments. The controller 4002 may write data in the semiconductor package 4003 or read data from the semiconductor package 4003, and may enhance an operation speed of the electronic system 4000.

The DRAM device 4004 may be a buffer memory for reducing the speed difference between the semiconductor package 4003 for storing data and the external host. The DRAM device 4004 included in the electronic system 4000 may serve as a cache memory, and may provide a space for temporarily storing data during the control operation for the semiconductor package 4003.

The semiconductor package 4003 may include first and second semiconductor packages 4003a and 4003b spaced apart from each other. The first and second semiconductor packages 4003a and 4003b may be semiconductor packages each of which includes a plurality of semiconductor chips 4200. Each of the first and second semiconductor packages 4003a and 4003b may include a package substrate 4100, the semiconductor chips 4200, bonding layers 4300 disposed under the semiconductor chips 4200, a connection structure 4400 for electrically connecting the semiconductor chips 4200 with the package substrate 4100, and a mold layer 4500 covering the semiconductor chips 4200 and the connection structure 4400 on the package substrate 4100.

The package substrate 4100 may be a printed circuit board (PCB) including package upper pads 4130. Each semiconductor chip 4200 may include an input/output pad 4210. The input/output pad 4210 may correspond to the input/output pad 3101 in FIG. 15. Each semiconductor chip 4200 may include gate electrode structures 5210, memory channel structures 5220 extending through the gate electrode structures 5210, and division structures 5230 for dividing the gate electrode structures 5210. Each semiconductor chip 4200 may include a memory device, for example, the accelerator memory included in the disaggregated memory system according to example embodiments.

In some example embodiments, the connection structure 4400 may be a bonding wire for electrically connecting the input/output pad 4210 and the package upper pads 4130.

The disaggregated memory system according to example embodiments may be packaged using various package types or package configurations.

Figure 17:
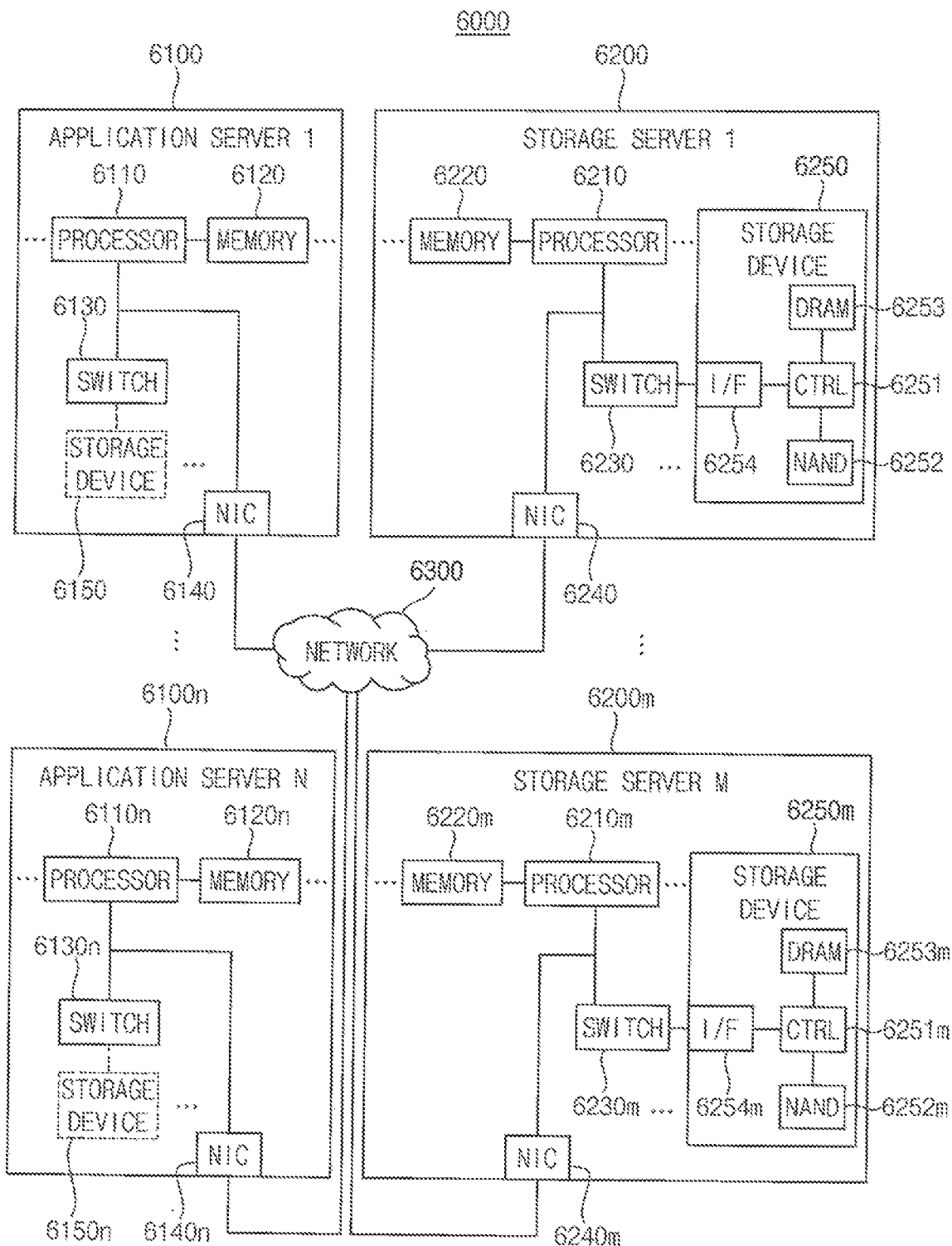
FIG. 17 is a block diagram illustrating a data center including a disaggregated memory system according to example embodiments.

FIG. 17 is a block diagram illustrating a data center including a disaggregated memory system according to example embodiments.

Referring to FIG. 17, a data center 6000 may be a facility that collects various types of data and provides various services, and may be referred to as a data storage center. The data center 6000 may be a system for operating search engines and databases, and may be a computing system used by companies such as banks or government agencies. The data center 6000 may include application servers 6100 to 6100n and storage servers 6200 to 6200m. The number of the application servers 6100 to 6100n and the number of the storage servers 6200 to 6200m may be variously selected according to example embodiments, and the number of the application servers 6100 to 6100n and the number of the storage servers 6200 to 6200m may be different from each other.

The application server 6100 may include at least one processor 6110 and at least one memory 6120, and the storage server 6200 may include at least one processor 6210 and at least one memory 6220. An operation of the storage server 6200 will be described as an example. The processor 6210 may control overall operations of the storage server 6200, and may access the memory 6220 to execute instructions and/or data loaded in the memory 6220. The memory 6220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 6210 and the number of the memories 6220 included in the storage server 6200 may be variously selected according to example embodiments. In some example embodiments, the processor 6210 and the memory 6220 may provide a processor-memory pair. In some example embodiments, the number of the processors 6210 and the number of the memories 6220 may be different from each other. The processor 6210 may include a single core processor or a multiple core processor. The above description of the storage server 6200 may be similarly applied to the application server 6100. The application server 6100 may include at least one storage device 6150, and the storage server 6200 may include at least one storage device 6250. In some example embodiments, the application server 6100 may not include the storage device 6150. The number of the storage devices 6250 included in the storage server 6200 may be variously selected according to example embodiments.

The application servers 6100 to 6100n and the storage servers 6200 to 6200m may communicate with each other through a network 6300. The network 6300 may be implemented using a fiber channel (FC) or an Ethernet. The FC may be a medium used for a relatively high speed data transmission, and an optical switch that provides high performance and/or high availability may be used. The storage servers 6200 to 6200m may be provided as file storages, block storages or object storages according to an access scheme of the network 6300.

In some example embodiments, the network 6300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 6300 may be a general or normal network such as the TCP/IP network. For example, the network 6300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 6100 and the storage server 6200. The description of the application server 6100 may be applied to the other application server 6100n, and the description of the storage server 6200 may be applied to the other storage server 6200m.

The application server 6100 may store data requested to be stored by a user or a client into one of the storage servers 6200 to 6200m through the network 6300. In addition, the application server 6100 may obtain data requested to be read by the user or the client from one of the storage servers 6200 to 6200m through the network 6300. For example, the application server 6100 may be implemented as a web server or a database management system (DBMS).

The application server 6100 may access a memory 6120n or a storage device 6150n included in the other application server 6100n through the network 6300, and/or may access the memories 6220 to 6220m or the storage devices 6250 to 6250m included in the storage servers 6200 to 6200m through the network 6300. Thus, the application server 6100 may perform various operations on data stored in the application servers 6100 to 6100n and/or the storage servers 6200 to 6200m. For example, the application server 6100 may execute a command for moving or copying data between the application servers 6100 to 6100n and/or the storage servers 6200 to 6200m. The data may be transferred from the storage devices 6250 to 6250m of the storage servers 6200 to 6200m to the memories 6120 to 6120n of the application servers 6100 to 6100n directly or through the memories 6220 to 6220m of the storage servers 6200 to 6200m. For example, the data transferred through the network 6300 may be encrypted data for security or privacy.

In the storage server 6200, an interface 6254 may provide a physical connection between the processor 6210 and a controller 6251 and/or a physical connection between a network interface card (MC) 6240 and the controller 6251. For example, the interface 6254 may be implemented based on a direct attached storage (DAS) scheme in which the storage device 6250 is directly connected with a dedicated cable. For example, the interface 6254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 6200 may further include a switch 6230 and the NIC 6240. The switch 6230 may selectively connect the processor 6210 with the storage device 6250 or may selectively connect the NIC 6240 with the storage device 6250 under a control of the processor 6210. Similarly, the application server 6100 may further include a switch 6130 and an NIC 6140.

In some example embodiments, the NIC 6240 may include a network interface card, a network adapter, or the like. The NIC 6240 may be connected to the network 6300 through a wired interface, a wireless interface, a Bluetooth interface, an optical interface, or the like. The NIC 6240 may further include an internal memory, a digital signal processor (DSP), a host bus interface, or the like, and may be connected to the processor 6210 and/or the switch 6230 through the host bus interface. The host bus interface may be implemented as one of the above-described examples of the interface 6254. In some example embodiments, the NIC 6240 may be integrated with at least one of the processor 6210, the switch 6230 and the storage device 6250.

In the storage servers 6200 to 6200m and/or the application servers 6100 to 6100n, the processor may transmit a command to the storage devices 6150 to 6150n and 6250 to 6250m or the memories 6120 to 6120n and 6220 to 6220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 6150 to 6150m and 6250 to 6250m may transmit a control signal and command/address signals to NAND flash memory devices 6252 to 6252m in response to a read command received from the processor. When data is read from the NAND flash memory devices 6252 to 6252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 6251 may control overall operations of the storage device 6250. In some example embodiments, the controller 6251 may include a static random access memory (SRAM). The controller 6251 may write data into the NAND flash memory device 6252 in response to a write command, or may read data from the NAND flash memory device 6252 in response to a read command. For example, the write command and/or the read command may be provided from the processor 6210 in the storage server 6200, the processor 6210m in the other storage server 6200m, or the processors 6110 to 6110n in the application servers 6100 to 6100n. A DRAM 6253 may temporarily store (e.g., may buffer) data to be written to the NAND flash memory device 6252 or data read from the NAND flash memory device 6252. Further, the DRAM 6253 may store meta data. The meta data may be data generated by the controller 6251 to manage user data or the NAND flash memory device 6252.

The storage device 6250 may correspond to the disaggregated memory system according to example embodiments, and may perform the method of operating the disaggregated memory system according to example embodiments. In other words, FIG. 17 illustrates an example where the disaggregated memory system according to example embodiments is implemented as a storage device.

The inventive concept may be applied to various electronic devices and systems that include the disaggregated memory systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a disaggregated memory system, the method comprising:
   receiving, by the disaggregated memory system, a plurality of memory management requests from a host device that is connected to the disaggregated memory system through a network or fabric interconnect, the plurality of memory management requests including a plurality of context values having different values for a plurality of workloads;
   transmitting, by the disaggregated memory system, the plurality of context values to an accelerator memory included in the disaggregated memory system and including a plurality of memory regions to set the plurality of context values for the plurality of memory regions based on the plurality of memory management requests;
   determining, by the disaggregated memory system, prefetch target data based on a context table and a memory access log, and transmitting prefetch information associated with the prefetch target data to the accelerator memory, the context table being maintained in and managed by the disaggregated memory system and including the plurality of context values, the memory access log being maintained in and managed by the disaggregated memory system and being associated with the accelerator memory; and
   storing, by the disaggregated memory system, the prefetch information in a prefetch target buffer included in the accelerator memory.

2. The method of claim 1, wherein the context table is included in the accelerator memory, and includes a relationship between the plurality of memory regions and the plurality of context values that are set for the plurality of memory regions.

3. The method of claim 2, wherein:
   the plurality of workloads include a first workload to an N-th workload, where N is a natural number greater than or equal to two,
   the plurality of context values include a first context value to an N-th context value,
   the first context value has a value for the first workload, and
   based on a first memory region among the plurality of memory regions being allocated for the first workload, the first context value is set for the first memory region.

4. The method of claim 3, wherein the plurality of workloads correspond to a plurality of applications that are executed on the host device.

5. The method of claim 3, wherein the plurality of workloads correspond to a plurality of virtual machines that are driven on the host device.

6. The method of claim 2, wherein the memory access log is included in the accelerator memory.

7. The method of claim 1, wherein determining the prefetch target data includes:
   extracting a context access log based on the context table and the memory access log;
   generating a context-aware access pattern model based on the context access log; and
   determining the prefetch target data based on the context-aware access pattern model, and
   wherein the prefetch information that is transmitted to the accelerator memory comprises the prefetch target data or an address of the prefetch target data.

8. The method of claim 7, wherein:
   the context access log is extracted from all of the plurality of workloads, the context-aware access pattern model is generated for all of the plurality of workloads, and
the prefetch target data is determined for all of the plurality of workloads.

9. The method of claim 7, wherein transmitting the prefetch information to the accelerator memory further includes:
selecting at least one of the plurality of context values.

10. The method of claim 9, wherein:
the context-aware access pattern model is generated for a selected workload corresponding to a selected context value among the plurality of workloads,
the prefetch target data is determined for the selected workload.

11. The method of claim 9, wherein the at least one of the plurality of context values is selected based on a context selection request received from the host device.

12. The method of claim 9, wherein the at least one of the plurality of context values is selected based on the context access log such that a context value having access counts more than a reference count is selected.

13. The method of claim 1, further comprising:
receiving an additional memory management request from the host device, the additional memory management request including at least one of the plurality of context values; and
transmitting the at least one of the plurality of context values to the accelerator memory to update the context table based on the additional memory management request.

14. The method of claim 1, wherein the plurality of memory management requests include a request for allocating the plurality of workloads to the plurality of memory regions, and a request for deallocating the plurality of workloads from the plurality of memory regions.

15. The method of claim 1, wherein the accelerator memory includes at least one of a phase change random access memory (PRAM), a flash memory, a resistance random access memory (RRAM), a magnetic random access memory (MRAM), or a ferroelectric random access memory (FRAM).

16. The method of claim 15, wherein each of the plurality of memory regions corresponds to one page included in the accelerator memory or to one memory block included in the accelerator memory.

17. A disaggregated memory system comprising:
a memory controller; and
an accelerator memory controlled by the memory controller, the accelerator memory including a plurality of memory regions, a context table, a memory access log, and a prefetch target buffer,
wherein the memory controller is configured to:
receive a plurality of memory management requests from a host device that is physically separate from the disaggregated memory system and connected to the disaggregated memory system through a network or fabric interconnect, the plurality of memory management requests including a plurality of context values having different values for a plurality of workloads,
manage the context table that is maintained in the accelerator memory such that the plurality of context values are set for the plurality of memory regions based on the plurality of memory management requests,
select prefetch target data based on the context table and the memory access log, the memory access log being maintained in the accelerator memory and being associated with the accelerator memory, and
transmit prefetch information associated with the prefetch target data to the accelerator memory, and
wherein the accelerator memory is configured to store the prefetch information in the prefetch target buffer.

18. The disaggregated memory system of claim 17, wherein the memory controller includes:
a context manager configured to manage the context table;
a context-aware access pattern trainer configured to extract a context access log based on the context table and the memory access log, and to generate a context-aware access pattern model based on the context access log; and
a context-aware prefetcher configured to determine the prefetch target data based on the context-aware access pattern model.

19. The disaggregated memory system of claim 17, further comprising:
a second accelerator memory controlled by the memory controller.

20. A method of operating a disaggregated memory system, the method comprising:
receiving, by the disaggregated memory system, a plurality of memory management requests from a host device that is connected to the host device through a network or fabric interconnect, the plurality of memory management requests including a plurality of context values having different values for a plurality of workloads;
transmitting, by the disaggregated memory system, a context table control signal and the plurality of context values to an accelerator memory that is included in the disaggregated memory system to manage a context table based on the plurality of memory management requests, the context table being maintained in and managed by the disaggregated memory system and including a relationship between a plurality of memory regions included in the accelerator memory and the plurality of context values that are set for the plurality of memory regions;
extracting, by the disaggregated memory system, a context access log from all of the plurality of workloads based on the context table and a memory access log, the memory access log being maintained in and managed by the disaggregated memory system and being associated with the accelerator memory;
selecting, by the disaggregated memory system, at least one of the plurality of context values based on a context selection request received from the host device or based on the context access log;
generating, by the disaggregated memory system, a context-aware access pattern model in the disaggregated memory system based on the context access log, the context-aware access pattern model being generated for a selected workload corresponding to a selected context value among the plurality of workloads;
determining, by the disaggregated memory system, prefetch target data for the selected workload based on the context-aware access pattern model;
transmitting, by the disaggregated memory system, the prefetch target data or an address of the prefetch target data to the accelerator memory; and
storing, by the disaggregated memory system, the prefetch target data or the address of the prefetch target data in a prefetch target buffer included in the accelerator memory.

* * * * *